US012473782B2

(12) United States Patent
Bibler et al.

(10) Patent No.: US 12,473,782 B2
(45) Date of Patent: Nov. 18, 2025

(54) MULTI-POSITION LADDER AND PORTIONS THEREOF

(71) Applicant: Werner Co., Greenville, PA (US)

(72) Inventors: Derek Bibler, Elk Grove Village, IL (US); Vlatko Papa, Skokie, IL (US); Oladapo Kolawole, Frankfort, IL (US); Thomas W. Parker, Jamestown, PA (US); Ruel Sanico Estandarte, Laguna (PH); Mark Harries C. Lanting, Manila (PH); Michael Melton, Glen Ellyn, IL (US)

(73) Assignee: WERNER CO., Greenville, PA (US)

( * ) Notice: Subject to any disclaimer, the term of this patent is extended or adjusted under 35 U.S.C. 154(b) by 1001 days.

(21) Appl. No.: 17/378,116

(22) Filed: Jul. 16, 2021

(65) Prior Publication Data

US 2022/0025704 A1 Jan. 27, 2022

Related U.S. Application Data

(60) Provisional application No. 63/156,167, filed on Mar. 3, 2021, provisional application No. 63/055,257, filed on Jul. 22, 2020.

(51) Int. Cl.
*E06C 1/383* (2006.01)
*E06C 1/22* (2006.01)

(52) U.S. Cl.
CPC ................ *E06C 1/383* (2013.01); *E06C 1/22* (2013.01)

(58) Field of Classification Search
CPC ................. E06C 1/32; E06C 7/50; E06C 1/18
See application file for complete search history.

(56) References Cited

U.S. PATENT DOCUMENTS 40,500 A 11/1863 Philips
302,066 A 7/1884 Walker
(Continued)

FOREIGN PATENT DOCUMENTS

CN 1397709 2/2003
CN 2823519 10/2006
(Continued)

OTHER PUBLICATIONS

DE3027240_A1 English translation from espacenet (Year: 1980).*
(Continued)

*Primary Examiner* — Daniel J Troy
*Assistant Examiner* — Susan M. Heschel
(74) *Attorney, Agent, or Firm* — Fitch, Even, Tabin & Flannery LLP

(57) ABSTRACT

A multi-function ladder having a front section having a first front rail and. a rear section. The ladder having a first hinge attached to the first front rail and the first rear rail. The ladder having a second hinge attached to the second front rail and the second rear rail. Each hinge having a locked state and an unlocked state. The ladder having an actuator directly attached to the front section and remote and separate and apart from the first hinge and the second hinge. When the first and second hinges are in the unlocked state, the rear section can be moved between a leaning ladder mode, a step ladder mode, a stairway ladder mode and a straight ladder mode upon which each hinge goes into the locked state in the desired ladder mode.

20 Claims, 39 Drawing Sheets

(56) References Cited

U.S. PATENT DOCUMENTS

| | | | | | |
|---|---|---|---|---|---|
| 510,108 | A | | 12/1893 | Barr | |
| 992,051 | A | | 5/1911 | Frank | |
| 1,491,642 | A | | 4/1924 | Swain | |
| 1,894,489 | A | | 1/1933 | Hirose | |
| 2,823,522 | A | | 2/1958 | Collins | |
| 3,811,151 | A | | 5/1974 | Kuemmerlin | |
| 4,087,885 | A | * | 5/1978 | Gillentine | B60N 2/236 16/334 |
| 4,574,918 | A | | 3/1986 | Marques | |
| 4,645,371 | A | * | 2/1987 | Wang | F16C 11/10 182/163 |
| 4,666,327 | A | | 5/1987 | Su | |
| 4,842,098 | A | | 6/1989 | Yuen | |
| 5,074,377 | A | * | 12/1991 | Krause | E06C 7/42 182/209 |
| 5,163,532 | A | | 11/1992 | McCarty | |
| 5,715,909 | A | | 2/1998 | Gagnon | |
| 5,779,059 | A | | 7/1998 | Kotch | |
| 5,937,968 | A | | 8/1999 | Gibson | |
| 5,954,157 | A | | 9/1999 | Grimes | |
| 6,026,933 | A | | 2/2000 | King | |
| 6,343,406 | B1 | | 2/2002 | Yeh | |
| 6,390,238 | B1 | | 5/2002 | Gibson | |
| 6,588,547 | B2 | * | 7/2003 | Yeh | E06C 1/32 182/163 |
| 7,140,072 | B2 | * | 11/2006 | Leng | E06C 1/32 16/326 |
| 7,857,179 | B1 | | 12/2010 | Allen | |
| 10,435,947 | B2 | | 10/2019 | Parker | |
| 10,487,576 | B2 | * | 11/2019 | Ballard | E06C 1/22 |
| 10,487,580 | B2 | | 11/2019 | Miao | |
| 10,772,494 | B1 | | 9/2020 | Konrad | |
| 10,975,622 | B2 | * | 4/2021 | Yoo | E06C 7/50 |
| 11,505,994 | B2 | * | 11/2022 | Foley | E06C 1/22 |
| 11,846,137 | B2 | | 12/2023 | Moss | |
| 2003/0085074 | A1 | | 5/2003 | Harmston | |
| 2011/0024234 | A1 | | 2/2011 | Lin | |
| 2011/0036666 | A1 | | 2/2011 | Hong | |
| 2017/0145745 | A1 | | 5/2017 | Kieffer | |
| 2017/0254145 | A1 | | 9/2017 | Ballard | |
| 2018/0163467 | A1 | | 6/2018 | Parker | |
| 2018/0355667 | A1 | | 12/2018 | Wang | |
| 2019/0376343 | A1 | * | 12/2019 | Maxfield | E06C 7/50 |
| 2019/0383099 | A1 | | 12/2019 | Yeh | |
| 2019/0383100 | A1 | | 12/2019 | Yoo | |
| 2020/0165870 | A1 | | 5/2020 | Moss | |
| 2020/0291722 | A1 | | 9/2020 | Barchine | |
| 2022/0341262 | A1 | | 10/2022 | Behm | |
| 2025/0084699 | A1 | | 3/2025 | Chen | |
| 2025/0101805 | A1 | | 3/2025 | Papa | |

FOREIGN PATENT DOCUMENTS

| | | | | |
|---|---|---|---|---|
| CN | 2823522 | Y | | 10/2006 |
| CN | 201144627 | Y | | 11/2008 |
| CN | 101338649 | | | 1/2009 |
| CN | 101338649 | A | | 1/2009 |
| CN | 101864890 | | | 10/2010 |
| CN | 202348099 | | | 7/2012 |
| CN | 202767864 | | | 3/2013 |
| CN | 203925264 | | | 11/2014 |
| CN | 204609748 | | | 9/2015 |
| CN | 105008652 | | | 10/2015 |
| CN | 107250479 | | | 10/2017 |
| CN | 206668013 | | | 11/2017 |
| CN | 206668013 | U | | 11/2017 |
| CN | 107724943 | | | 2/2018 |
| CN | 107724943 | A | | 2/2018 |
| CN | 108798480 | | | 11/2018 |
| CN | 109154172 | | | 1/2019 |
| CN | 110306923 | | | 10/2019 |
| CN | 110344747 | | | 10/2019 |
| CN | 210685838 | | | 6/2020 |
| CN | 113969748 | | | 1/2022 |
| CN | 217028761 | | | 7/2022 |
| CN | 217028761 | U | | 7/2022 |
| DE | 2741091 | | | 3/1979 |
| DE | 3027240 | | * | 7/1980 |
| DE | 9402746 | | | 6/1995 |
| DE | 10008174 | | | 4/2001 |
| EP | 2090740 | | | 8/2009 |
| EP | 2845987 | | | 3/2015 |
| EP | 3260646 | | | 12/2017 |
| FR | 2715187 | | | 7/1995 |
| FR | 2832608 | | | 5/2003 |
| GB | 769002 | | | 2/1957 |
| GB | 863900 | | | 3/1961 |
| JP | S4115401 | Y | | 7/1966 |
| JP | S54134632 | | | 10/1979 |
| JP | S57194600 | U | | 12/1982 |
| JP | 2008528834 | A | | 7/2008 |
| TW | M620750 | U | | 12/2021 |
| WO | 2021053590 | A1 | | 3/2021 |
| WO | 2021168242 | A1 | | 8/2021 |
| WO | 2023147182 | | | 8/2023 |

OTHER PUBLICATIONS

Little Giant, A-Force 300 Ladder specification sheet, product believed to be publicly available as early as Sep. 25, 2023, 6 pp.

Patent Cooperation Treaty, International Searching Authority, Notification of Transmittal of the International Search Report and the Written Opinion of the International Searching Authority, or the Declaration, issued in International Application No. PCT/US2023/012018, May 24, 2023, 13 pp.

U.S. Appl. No. 18/890,135, filed Sep. 19, 2024.

International Search Report and Written Opinion issued in App. No. PCT/US2023/036498, mailing date Feb. 22, 2024, 9 pages.

International Search Report and Written Opinion issued in App. No. PCT/IB2020/058698, mailing date Oct. 22, 2020, 11 pages.

International Preliminary Report on Patentability issued in App. No. PCT/IB2020/058698, issued Mar. 15, 2022, 7 pages.

Extended European Search Report issued in App. No. EP20866566.1, dated Aug. 14, 2023, 7 pages.

* cited by examiner

MULTI-POSITION LADDER AND PORTIONS THEREOF

CROSS-REFERENCE TO RELATED APPLICATIONS

This is a nonprovisional of U.S. provisional applications Ser. No. 63/055,257 filed Jul. 22, 2020 and Ser. No. 63/156,167 filed Mar. 3, 2021, all of which are incorporated by reference herein.

FIELD OF THE INVENTION

The present invention pertains to a multi position ladder having remote actuation of the hinges. (As used herein, references to the "present invention" or "invention" relate to exemplary embodiments and not necessarily to every embodiment encompassed by the appended claims.) More specifically, the present invention pertains to a multi position ladder having remote actuation of the hinges where the multi-position ladder may be in a leaning ladder mode, a stepladder mode, a stairway ladder mode and a straight ladder mode.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Ladders are used in a multitude of different ways. To avoid necessarily having to have a specific type of a ladder for a specific type of job, a ladder that can be configured in different ways for different jobs in different locations is desirable. However, a multi-position ladder must be easy to reconfigure to be able to be used.

BRIEF SUMMARY OF THE INVENTION

The present invention pertains to a multi-function ladder. The ladder comprises a front section having a first front rail and a second front rail and rungs attached to and between the first front rail and the second front rail. The ladder comprises a rear section having a first rear rail and a second rear rail and rungs attached to and between the first rear rail and the second rear rail. The rear section having a telescoping section attached to the first rear rail and the second rear rail to vary a length of the rear section. The ladder comprises a first hinge attached to the first front rail and the first rear rail. The ladder comprises a second hinge attached to the second front rail and the second rear rail, each hinge having a locked state in an unlocked state. The ladder comprises an actuator directly attached to the front section and remote and separate and apart from the first hinge and the second hinge. The actuator when actuated moving the first and second hinges between the locked state and the unlocked state. When the first and second hinges are in the unlocked state, the rear section can be moved between a leaning ladder mode, a step ladder mode, a stairway ladder mode and a straight ladder mode upon which each hinge goes into the locked state in the desired ladder mode.

The present invention pertains to a method for using a multifunction ladder. The method comprises the step of actuating an actuator attached to a front section of the ladder causing a first hinge to move between a locked state and an unlocked state and a second hinge to move between a lock state and an unlocked state. The first hinge attached to a first front rail of the front section of the ladder and a first rear rail of a rear section of the ladder. The second hinge attached to a second front rail of the front section of the ladder and a second rear rail of the rear section of the ladder. The actuator remote separate and apart from the first hinge and the second hinge. The rear section having a telescoping section. There is the step of moving the rear section relative to the front section about the first and second hinges when the first and second hinges are in the unlocked state to either a leaning ladder mode, a stepladder mode, a stairway ladder mode, and a straight ladder mode. There is the step of locking the rear section relative to the front section in the desired ladder mode.

The present invention pertains to a method for producing a multifunction ladder. The method comprises the steps of attaching an actuator to a rung on a front section of the ladder. The actuator causes a first hinge and a second hinge of the ladder to move between a locked state and an unlocked state. There is the step of attaching a first cable to the actuator and the first hinge and a second cable to the actuator and the second hinge, the first hinge and the second hinge attached to the front section and a rear section of the ladder.

The present invention pertains to a multi-position ladder. The ladder comprises a front section having a first front rail and a second front rail and rungs attached to and between the first front rail and the second front rail. The ladder comprises a rear section having a first rear rail and a second rear rail and rungs attached to and between the first rear rail and the second rear rail. The rear section having a telescoping section attached to the first rear rail and the second rear rail to vary a length of the rear section. The ladder comprises a first hinge attached to the first front rail and the first rear rail. The first hinge comprises a frame which is fixedly attached to the first front rail. The first hinge comprises a rear rail hinge portion fixedly attached to the first rear rail and pivotally attached to the frame to rotate relative to the bracket. The rear rail hinge portion having a perimeter and having a plurality of slots which extend from the perimeter. The slot of the plurality of slots corresponding with a desired position of the first rear rail relative to the front. The first hinge comprises a lock assembly disposed in the rear rail hinge portion. The lock assembly having a lock bar. When the lock bar is disposed in one of the plurality of slots, the lock bar locks the first rear rail into a locked state in a desired position relative to the first front rail so the first rear rail cannot move relative to the first front rail. When the lock bar is disposed outside of one of the plurality of slots, the lock bar unlocks the first rear rail into an unlocked state and the first rear rail can move relative to the first front rail. The ladder comprises a second hinge attached to the second front rail and the second rear rail. Each hinge having a locked state and an unlocked state. The ladder comprises an actuator which is attached to the lock bar to move the lock bar out of one of the plurality of slots in which the lock bar is disposed in a locked state, into an unlocked state.

The present invention pertains to a hinge attached to a first front rail and a first rear rail. The hinge comprises a frame which is fixedly attached to the first front rail. The hinge comprises a rear rail hinge portion fixedly attached to the first rear rail and pivotally attached to the frame to rotate relative to the bracket. The rear rail hinge portion having a perimeter and having a plurality of slots which extend from the perimeter. The slot of the plurality of slots corresponding with a desired position of the first rear rail relative to the front. The hinge comprises a lock assembly disposed in the rear rail hinge portion, the lock assembly having a lock bar, when the lock bar is disposed in one of the plurality of slots, the lock bar locks the first rear rail into a locked state in a desired position relative to the first front rail so the first rear rail cannot move relative to the first front rail, when the lock bar is disposed outside of one of the plurality of slots, the lock bar unlocks the first rear rail into an unlocked state and the first rear rail can move relative to the first front rail.

The present invention pertains to a method for using a multi-position ladder. The method comprises the steps of actuating an actuator attached to a front section of the ladder causing a first hinge to move between a locked state and an unlocked state and a second hinge to move between a locked state and an unlocked state. The first hinge attached to a first front rail of the front section of the ladder and a first rear rail of a rear section of the ladder. The second hinge attached to a second front rail of the front section of the ladder and a second rear rail of the rear section of the ladder. The actuator remote separate and apart from the first hinge and the second hinge. The rear section having a telescoping section. There is the step of moving the rear section relative to the front section about the first and second hinges when the first and second hinges are in the unlocked state to either a leaning ladder mode, a stepladder mode, a stairway ladder mode, and a straight ladder mode. There is the step of locking the rear section relative to the front section in the desired ladder mode.

The present invention pertains to a method for producing a multi-position ladder. The method comprises the steps of attaching an actuator to a rung on a front section of the ladder. The actuator causes a first hinge and a second hinge of the ladder to move between a locked state and an unlocked state. There is the step of attaching a first cable to the actuator and the first hinge and a second cable to the actuator and the second hinge, the first hinge and the second hinge attached to the front section and a rear section of the ladder . . .

DETAILED DESCRIPTION

Figure 1:
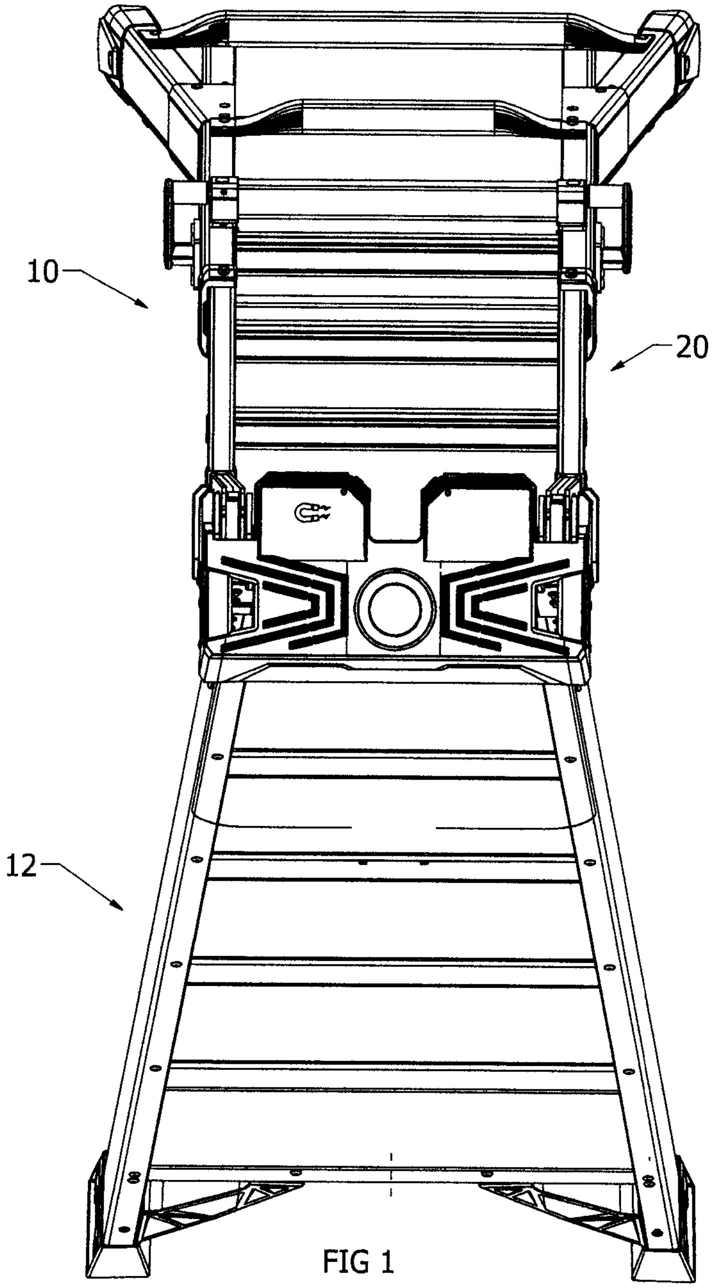
FIG. 1 shows an overhead view of the multi-position ladder in the stepladder mode.

Referring now to the drawings wherein like reference numerals refer to similar or identical parts throughout the several views, and more specifically to FIGS. 6-8, 11 and 15 thereof, there is shown a multi-position ladder 10. The ladder 10 comprises a front section 12 having a first front rail 14 and a second front rail 16 and rungs 18 attached to and between the first front rail 14 and the second front rail 16. The ladder 10 comprises a rear section 20 having a first rear rail 22 and a second rear rail 24 and rungs 26 attached to and between the first rear rail 22 and the second rear rail 24. The rear section 20 having a telescoping section 28 attached to the first rear rail 22 and the second rear rail 24 to vary a length of the rear section 20. The ladder 10 comprises a first hinge 30 attached to the first front rail 14 and the first rear rail 22. The ladder 10 comprises a second hinge 48 attached to the second front rail 16 and the second rear rail 24, each hinge having a locked state in an unlocked state. The ladder 10 comprises an actuator 50 directly attached to the front section 12 and remote and separate and apart from the first hinge 30 and the second hinge 48. The actuator 50 when actuated moving the first and second hinges 30, 48 between the locked state and the unlocked state. When the first and second hinges 30, 48 are in the unlocked state, the rear section 20 can be moved between a leaning ladder mode, a step ladder mode, a stairway ladder mode and a straight ladder mode upon which each hinge goes into the locked state in the desired ladder mode.

Figure 5:
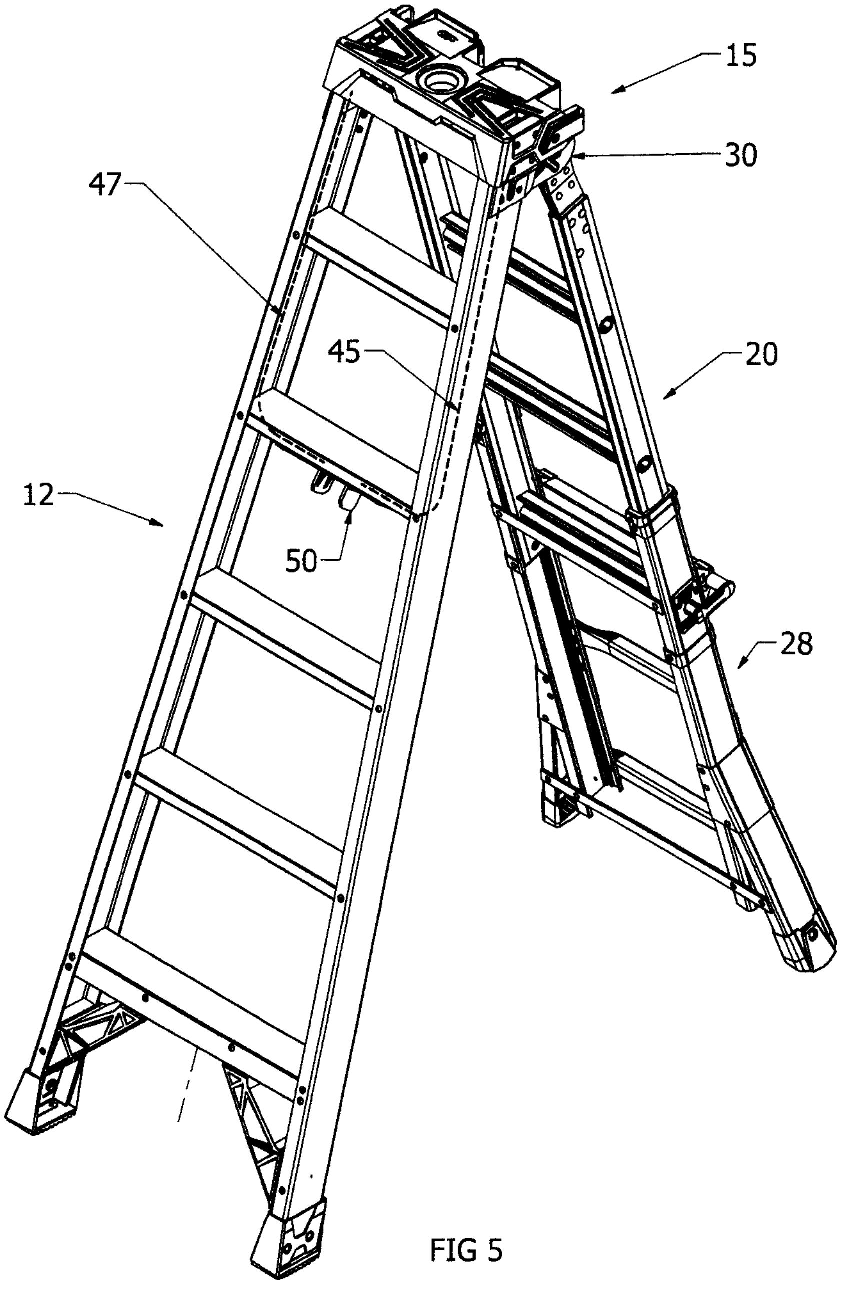
FIG. 5 shows a perspective view of the ladder in the stepladder mode and shows the cable routing in regard to the locking and unlocking of the hinges.
Figure 23:
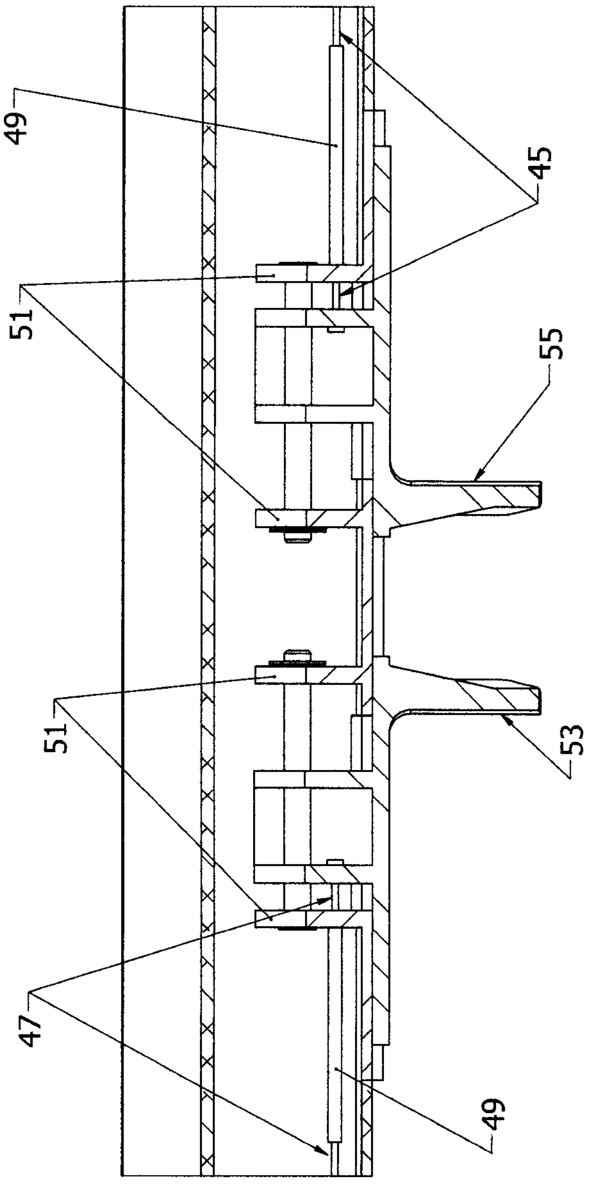
FIG. 23 shows the actuator, which is attached to a desired rung which is easily accessible, and is remote and separate and apart from the first hinge.

The actuator 50 when actuated may simultaneously move the first and second hinges 30, 48 between the lock state and the unlocked state. The ladder 10 may include a first cable 45 attached to the actuator 50 and to the first hinge 30, and a second cable 47 attached to the actuator 50 and to the second hinge 48. When the actuator 50 is actuated, the first cable 45 is pulled causing the first hinge 30 to move between the locked state to the unlocked state, and the second cable 47 is pulled causing the second hinge 48 to move between the locked state to the unlocked state. The actuator 50 may be attached to the front section 12 or the rear section 20 or to a rung or a rail of the front section 12 or the rear section 20, as shown in FIG. 5 and FIG. 23.

The present invention pertains to a method for using a multi-position ladder 10. The method comprises the step of actuating an actuator 50 attached to a front section 12 of the ladder 10 causing a first hinge 30 to move between a locked state and an unlocked state and a second hinge 48 to move between a lock state and an unlocked state. The first hinge 30 attached to a first front rail 14 of the front section 12 of the ladder 10 and a first rear rail 22 of a rear section 20 of the ladder 10. The second hinge 48 attached to a second front rail 16 of the front section 12 of the ladder 10 and a second rear rail 24 of the rear section 20 of the ladder 10. The actuator 50 remote separate and apart from the first hinge 30 and the second hinge 48. The rear section 20 having a telescoping section 28. There is the step of moving the rear section 20 relative to the front section 12 about the first and second hinges 30, 48 when the first and second hinges 30, 48 are in the unlocked state to either a leaning ladder mode, a stepladder mode, a stairway ladder mode, and a straight ladder mode. There is the step of locking the rear section 20 relative to the front section 12 in the desired ladder mode.

The present invention pertains to a method for producing a multi-position ladder 10. The method comprises the steps of attaching an actuator 50 to a rung on a front section 12 of the ladder 10. The actuator 50 causes a first hinge 30 and a second hinge 48 of the ladder 10 to move between a locked state and an unlocked state. There is the step of attaching a first cable 45 to the actuator 50 and the first hinge 30 and a second cable 47 to the actuator 50 and the second hinge 48, the first hinge 30 and the second hinge 48 attached to the front section 12 and a rear section 20 of the ladder 10.

Figure 22:
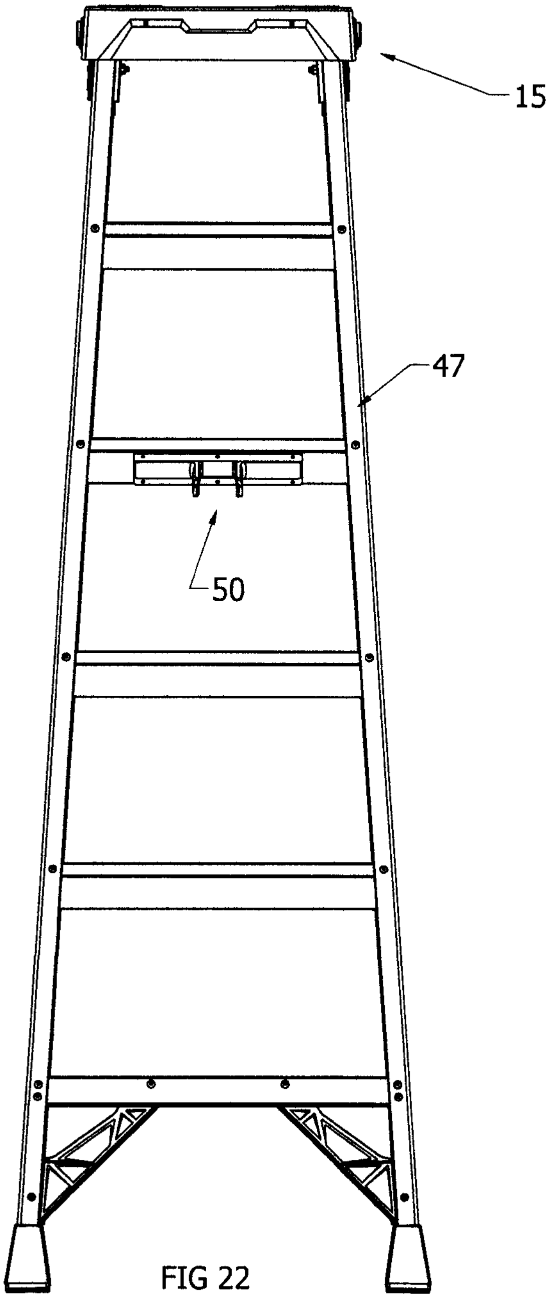
FIG. 22 is a front view of the front section having a remote actuator for unlocking both hinges at the same time so the rear section can be changed to different modes.

The present invention pertains to a multi-position ladder 10 that is type 1 AA ANSI rated for a 375-pound load. The multi-position ladder 10 may have built-in storage. The ladder 10 can be folded to a stowed and leaning position, configured like a step ladder, and moved to a straight ladder configuration, as shown in FIGS. 6-8 and 11. These different positions are controlled by locking hinges which connect the front and rear/fly ladder sections. The two hinges are unlocked through a remote cable system by squeezing the actuation levers with one hand, as shown in FIGS. 22 and 23. The actuation levers are positioned at a convenient height regardless of the size of the ladder 10.

Figure 12:
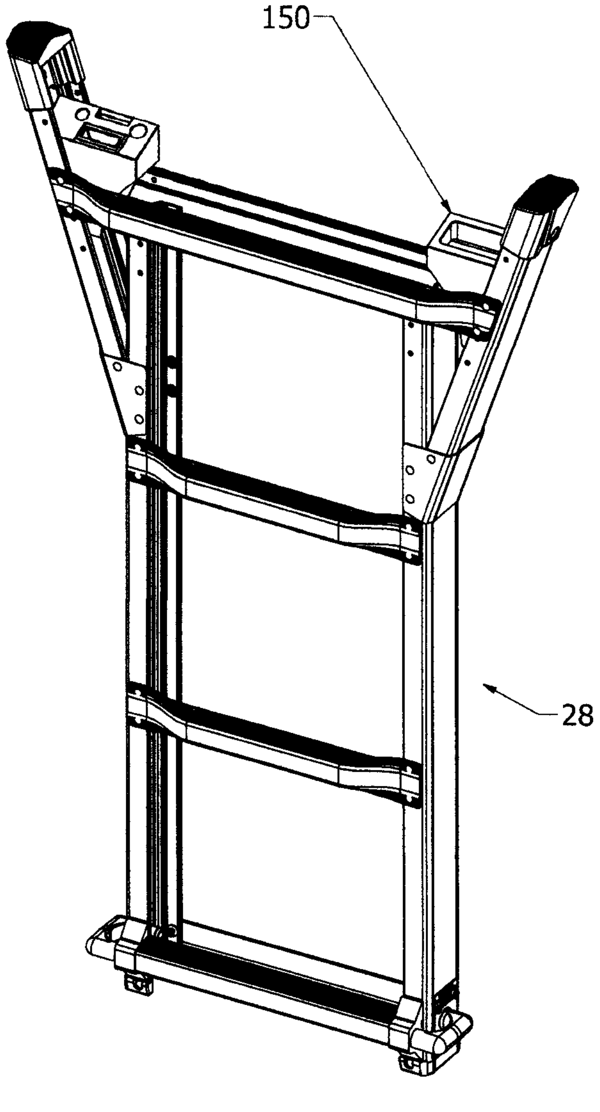
FIG. 12 shows a sectional front perspective view of the telescoping section of the ladder in the straight ladder mode.
Figure 13:
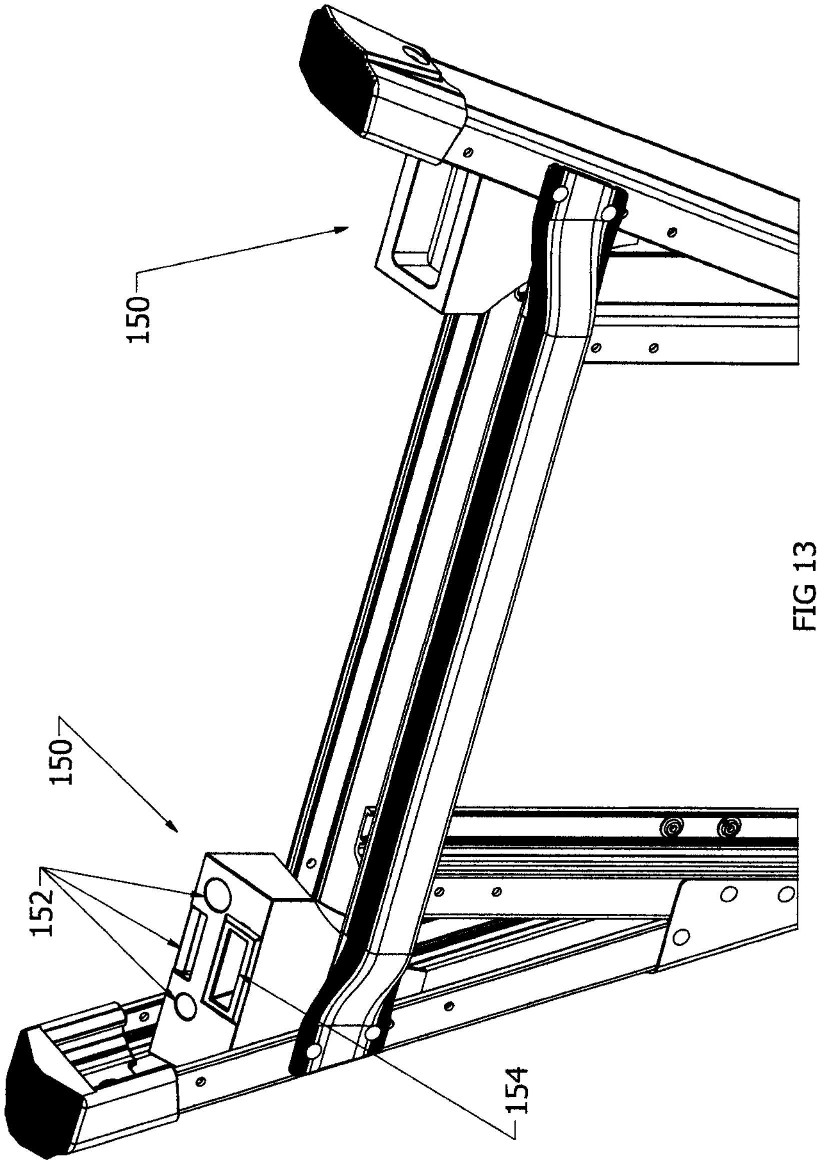
FIG. 13 shows a more detailed view of the storage trays.
Figure 14:
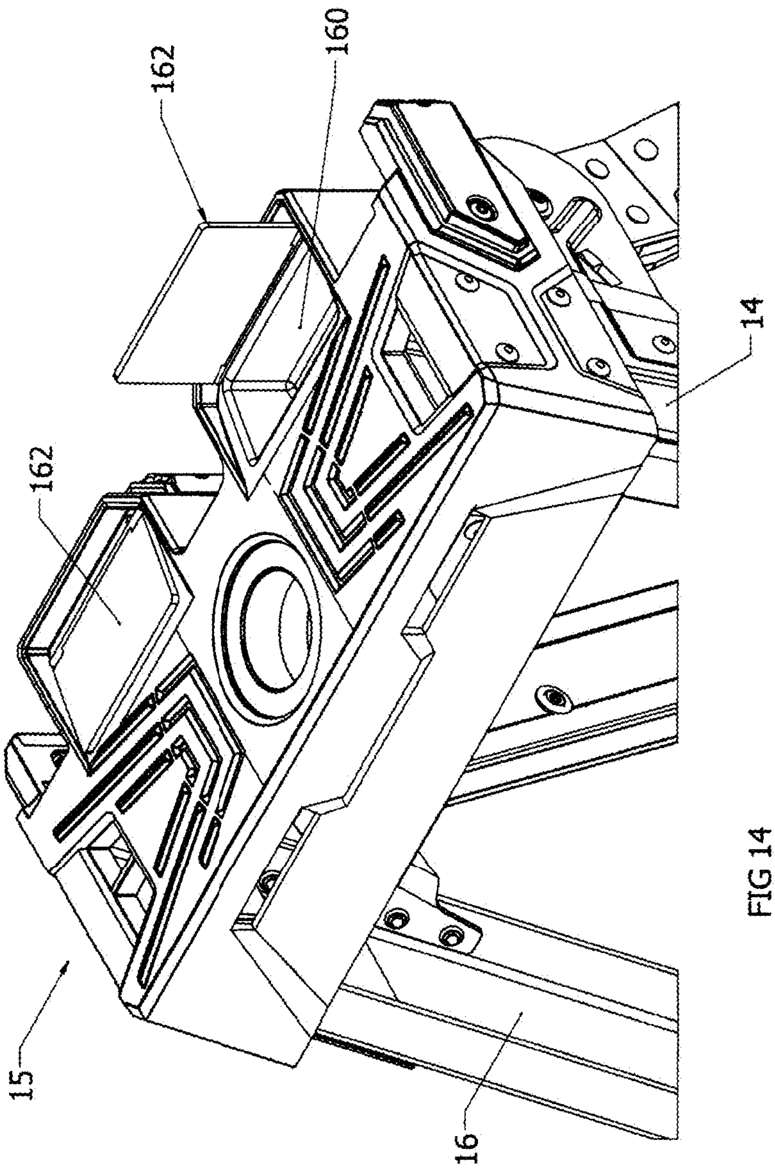
FIG. 14 shows the ladder top.

Storage bins 160 with hinged lids 162 are built into the ladder top 15, as shown in FIG. 14. Additional storage compartments are in the telescoping portion of the rear/fly ladder section for use when the ladder 10 is in straight mode, as shown in FIGS. 12 and 13. The rear/fly ladder section is designed to both shorten and lengthen relative to the conventional step ladder length. The ability to shorten permits this ladder 10 to be used on stairways. The rear/fly section storage allows for better functionality and convenience to the user. One-handed hinge operation using cables provides added convenience when changing ladder 10 configurations. The shortening/lengthening rear section 20 design enables stairway mode to be added to any step ladder.

Figure 2:
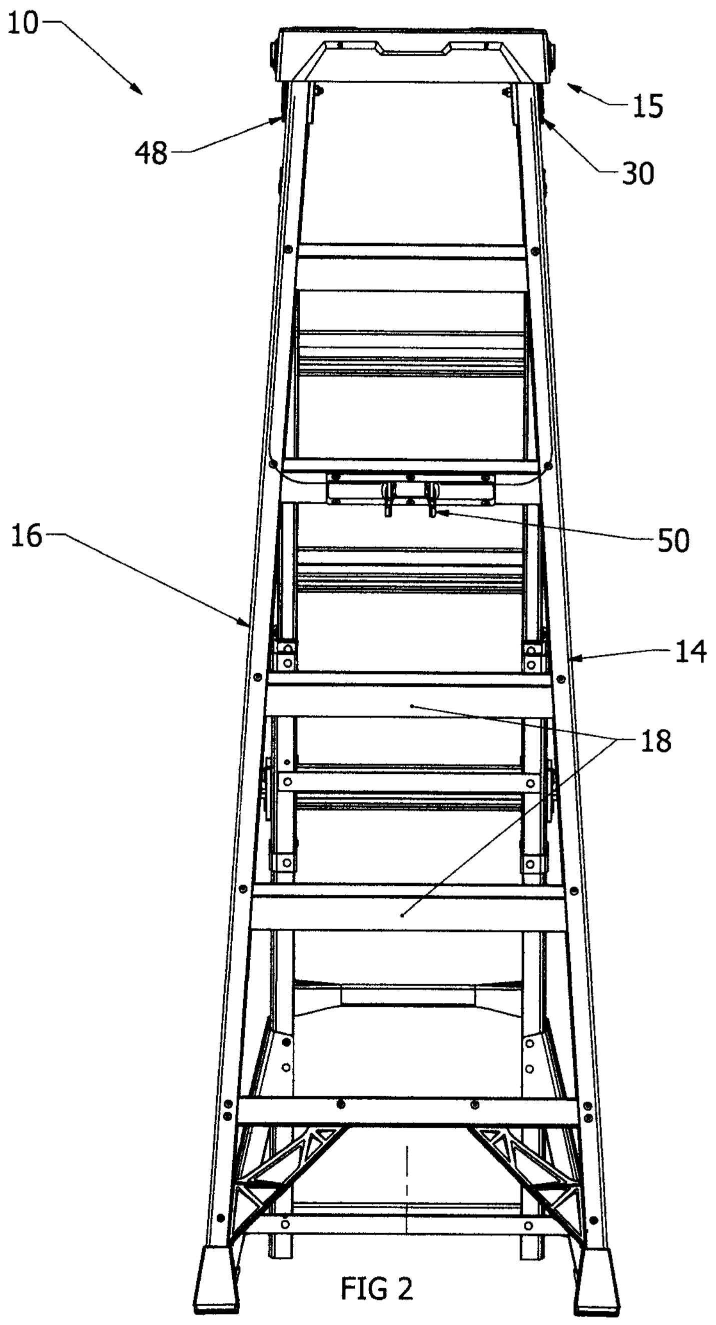
FIG. 2 shows a front view of the ladder.
Figure 3:
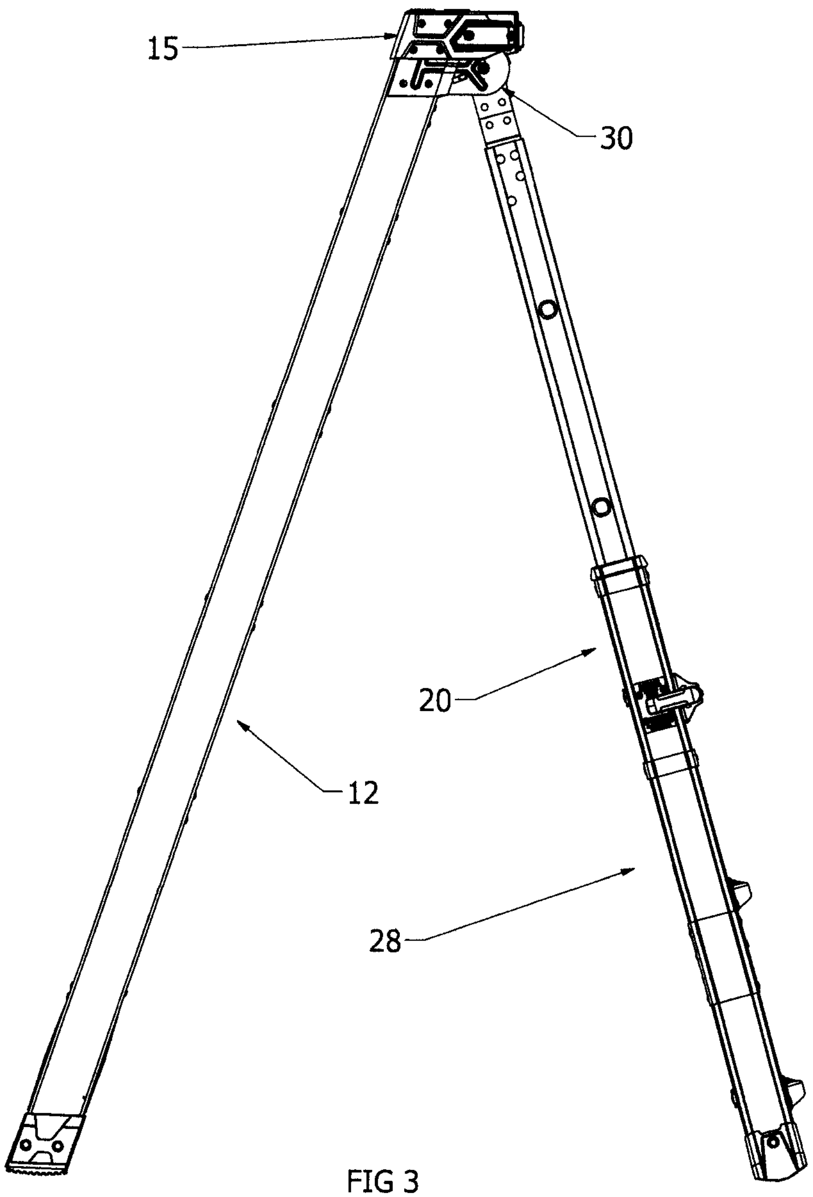
FIG. 3 shows a side view of the ladder in the stepladder bowed.
Figure 4:
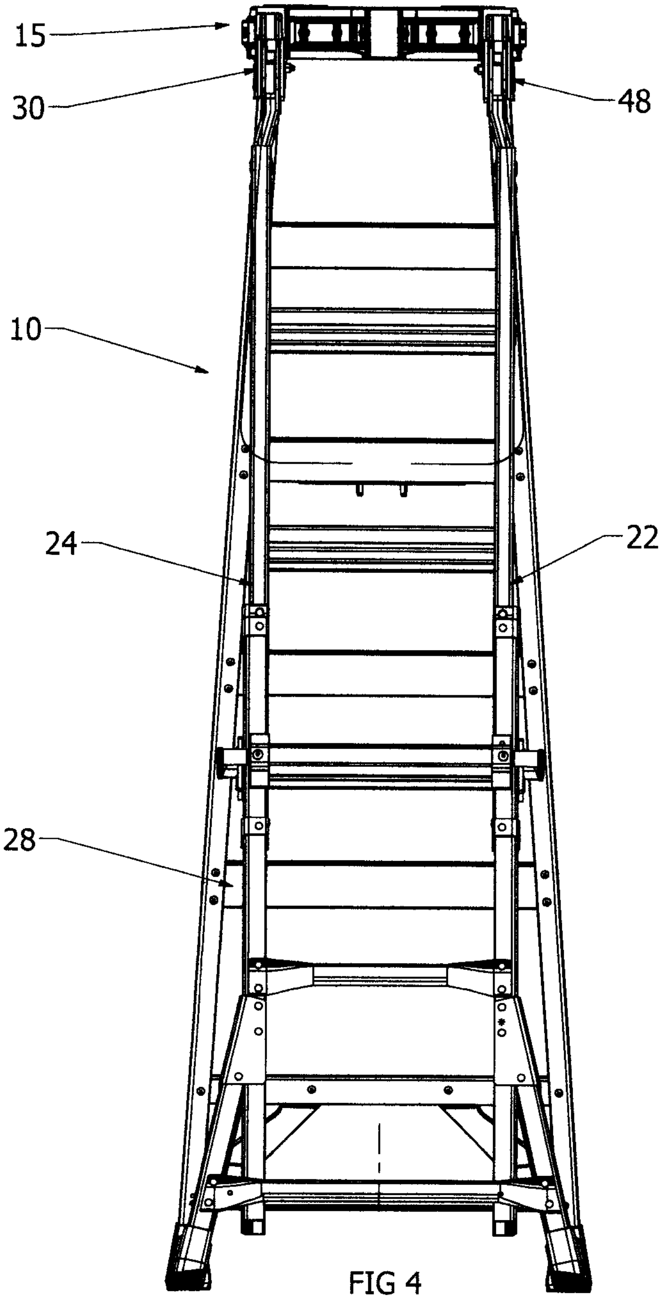
FIG. 4 shows a rear view of the ladder.

FIG. 1 shows an overhead view of the multi-position ladder 10 in the stepladder mode. FIG. 2 shows a front view of the ladder 10. FIG. 3 shows a side view of the ladder 10 in the stepladder bowed. FIG. 4 shows a rear view of the ladder 10. FIG. 5 shows a perspective view of the ladder 10 in the stepladder mode and shows the cable routing in regard to the locking and unlocking of the hinges. As can be seen from these figures, the front section 12 has a first front rail 14, a second front rail 16 in parallel and spaced relation with the first front rail 14 and rungs 18 attached to and between the first front rail 14 and the second front rail 16. The rear section 20 has a first rear rail 22 and a second rear rail 24 in parallel and spaced relation with the first rear rail 22 and rungs 26 attached to and between the first rear rail 22 and the second rear rail 24. The rear section 20 has a telescoping section 28 that fits to the rear section 20 with a Mock 29 to lock the telescoping section 28 to the rear section 20 at a desired position, as is well known in the art of multipurpose ladders. The telescoping section 28 has a first telescoping rail and a second telescoping rail in parallel and spaced relation with the first telescoping rail and rungs 18 attached to and between the first telescoping rail and the second telescoping rail. The rungs 18 are attached to flanges of the first and second telescoping rails with double rivets, as is well known in the art of multipurpose ladders. In addition, the telescoping section 28 may have a first angled piece and a second angled piece extending at an angle outward from the first telescoping rail and the second telescoping rail, respectively. There may be a rung attached to and between the first angled piece and the second angled piece.

Figure 6:
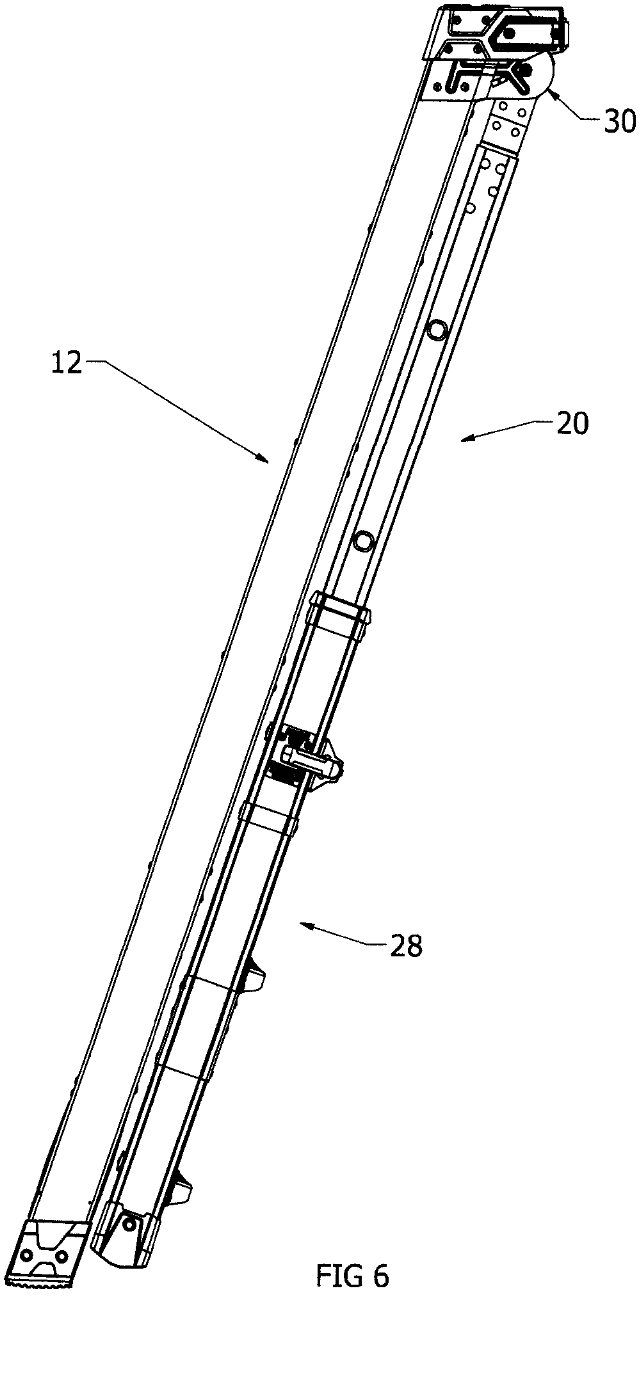
FIG. 6 shows the ladder in the leaning ladder mode where the rear section is folded to the front section.

FIG. 6 shows the ladder 10 in the leaning ladder mode where the rear section 20 is folded to the front section 12. The length of the rear section 20 is such that in the leaning ladder mode, the bottom of the rear section 20 clears the ground so the ladder top 15 can lean against a surface of an object, such as a wall, without any obstruction by the rear section 20.

Figure 7:
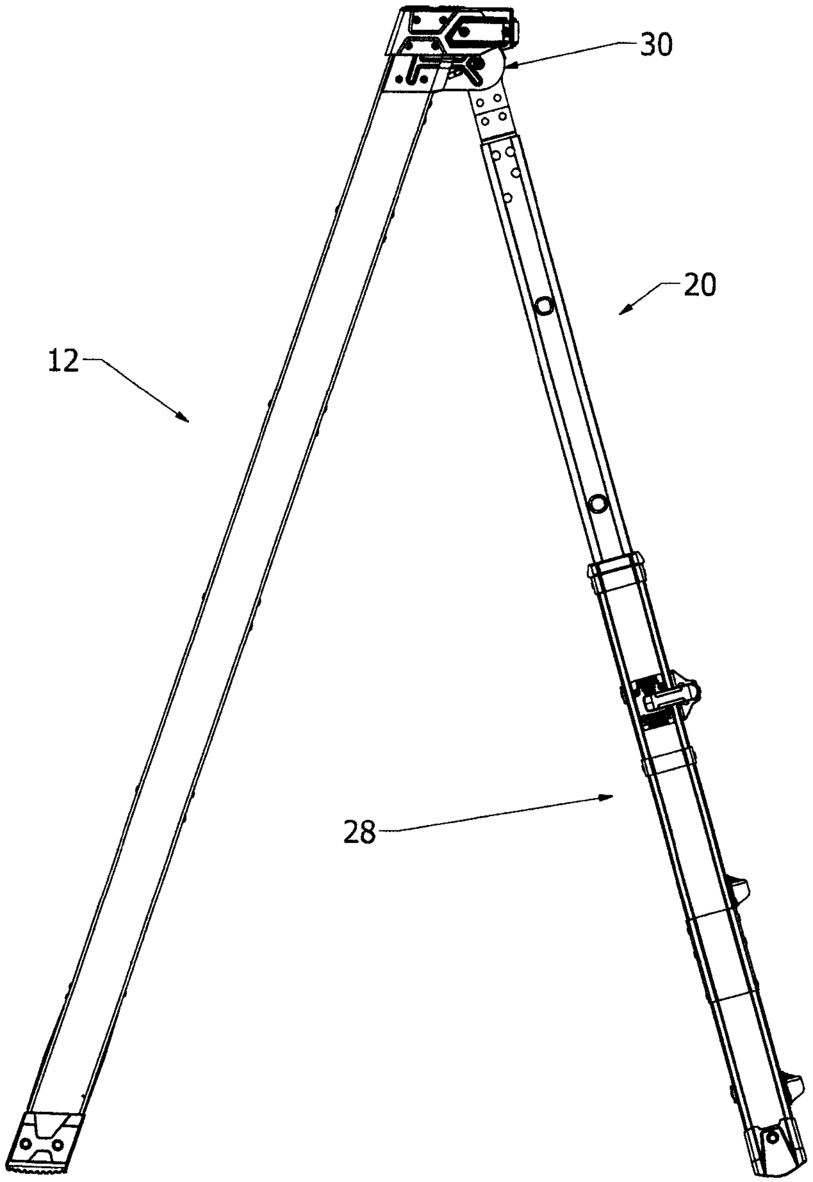
FIG. 7 shows the ladder in the stepladder mode where the rear section forms an angle with the front section, essentially having the shape of an upside-down V from a side view.

FIG. 7 shows the ladder 10 in the stepladder mode where the rear section 20 forms an angle with the front section 12, essentially having the shape of an upside-down V from a side view. It should be noted that in FIG. 6 and FIG. 7 showing side views of the ladder 10 in the leaning ladder mode and the stepladder mode, respectively, a telescoping section 28 of the rear section 20 is positioned so that the telescoping section 28 extends below at least one rung of the rear section 20.

Figure 8:
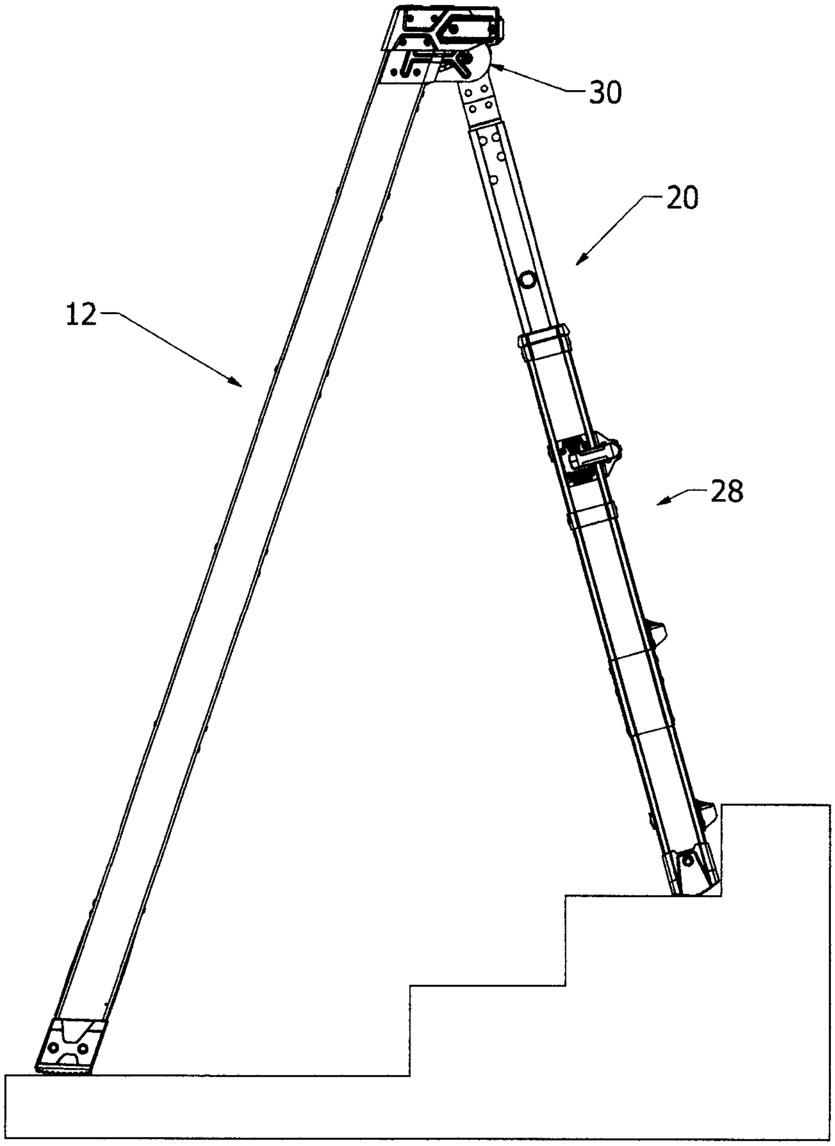
FIG. 8 shows the ladder in the stairway ladder mode.

FIG. 8 shows the ladder 10 in the stairway ladder mode where the rear section 20 forms an angle with the front section 12, essentially having the shape of an upside-down V from a side view, but with the rear section 20 having a length which is shortened compared to the length of the rear section 20 in the stepladder mode, so the rear section 20 can rest on a step that has a higher elevation than the ground on which the front section 12 is resting. In the stairway ladder mode, the telescoping section 28 has been shortened by moving the telescoping section 28 upwards at least one rung relative to the rear section 20, since in the leaning ladder mode or the stepladder mode, the telescoping section 28 extends below at least one rung of the rear section 20, so there is space for this telescoping section 28 to move up when in the stairway ladder mode.

Figure 9:
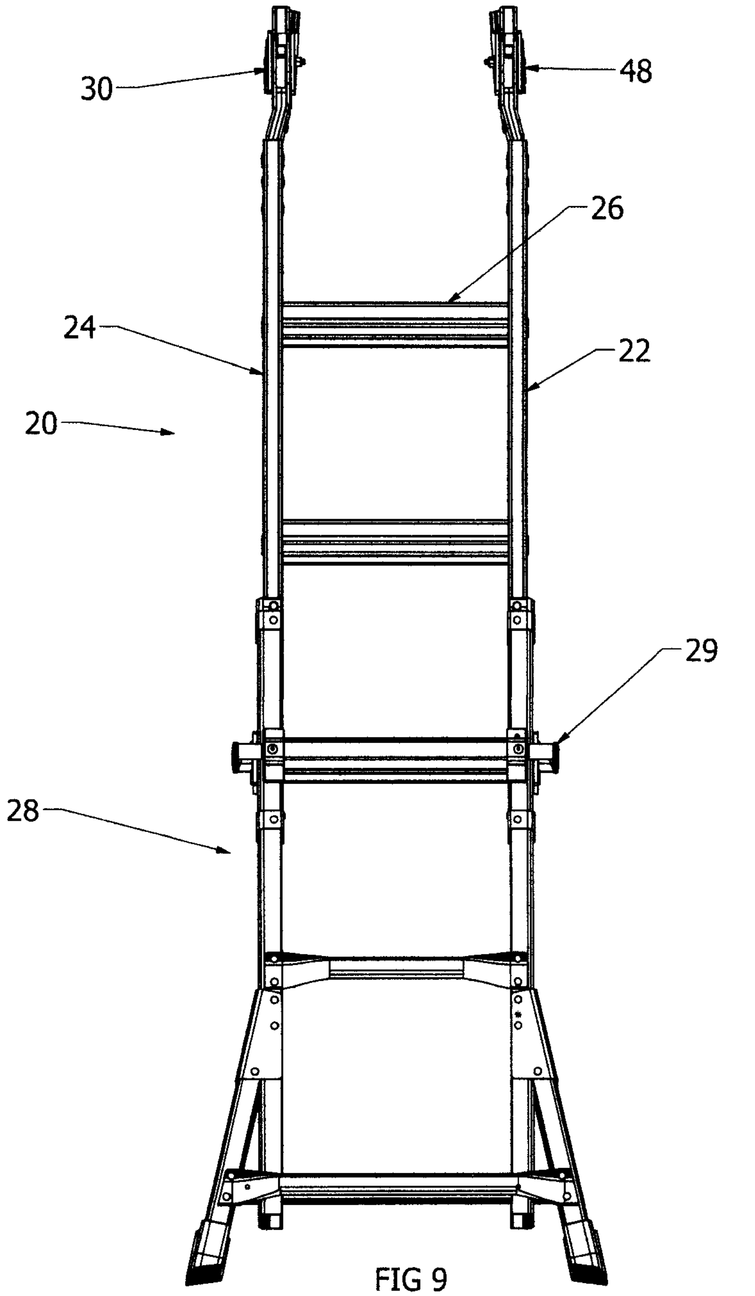
FIG. 9 shows the rear section in either the leaning ladder mode or the stepladder mode.

FIG. 9 shows the rear section 20 in either the leaning ladder mode or the stepladder mode. The telescoping section 28 is extended by at least one rung below the rear section 20. A J-lock 29 locks the telescoping section 28 in position by fitting into a hole in the desired rung, as is well known in the art.

Figure 10:
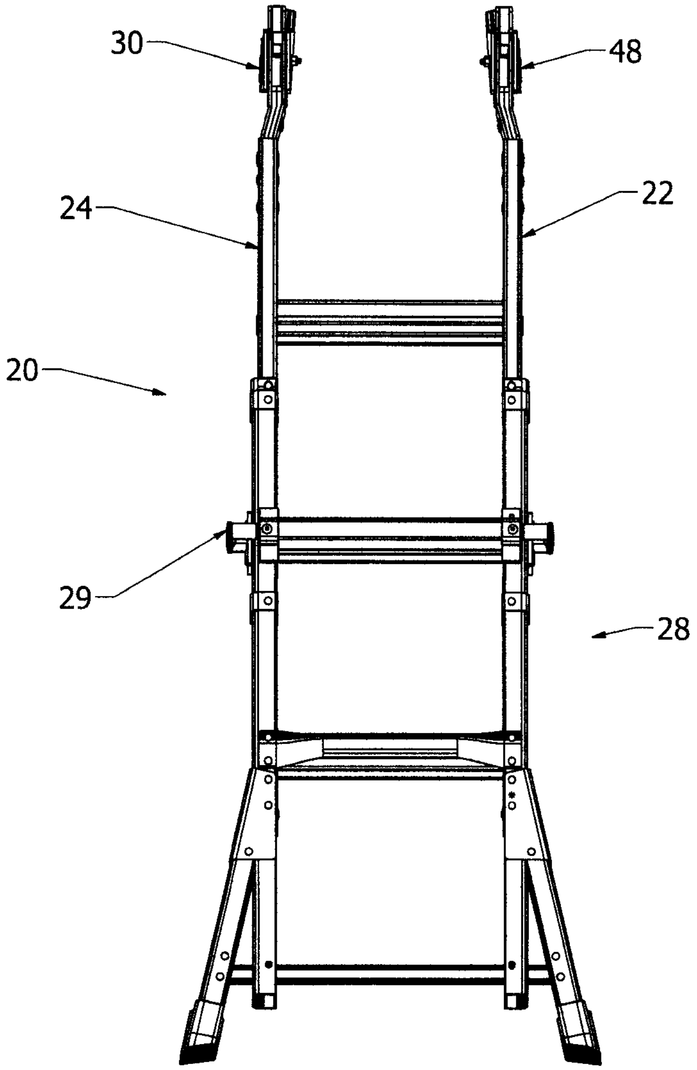
FIG. 10 shows the rear section in the stairway mode.

FIG. 10 shows the rear section 20 in the stairway mode. In the stairway mode, the J-lock 29 has been released so the telescoping section 28 can be moved up to the at least one rung below the rear section 20 in the stepladder mode, so the overall length of the rear section 20 is now shorter to accommodate the different elevations of the step on which the rear section 20 rest and the ground which the front section 12 rests. After the telescoping section 28 has been retracted and repositioned, the J-lock 29 is put back into the locked position.

Figure 11:
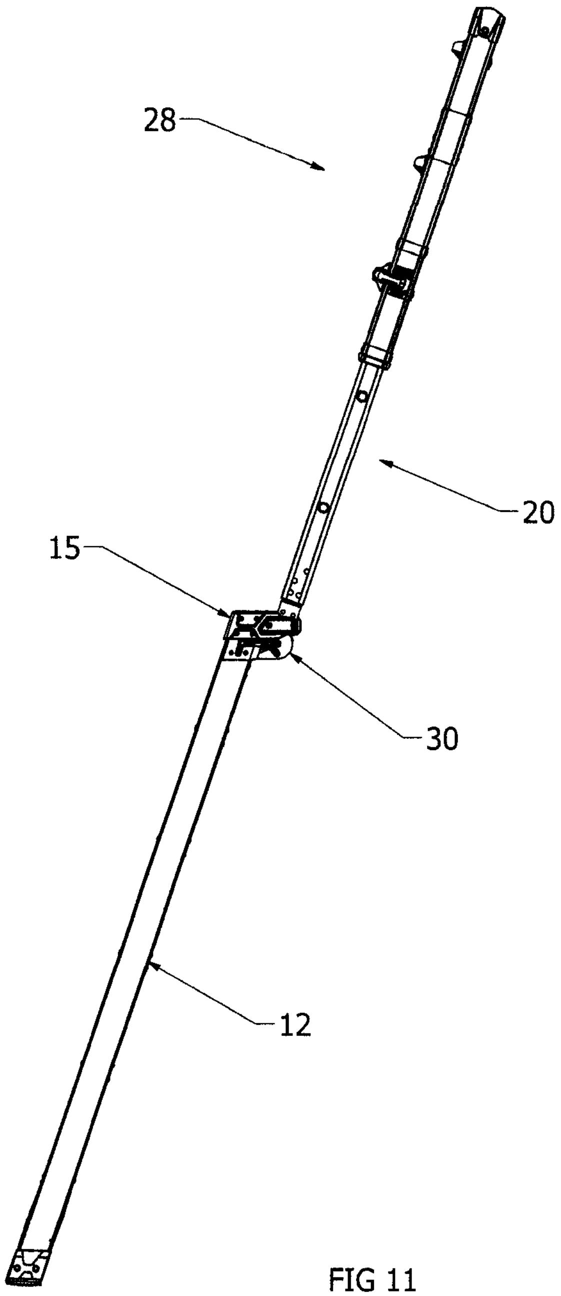
FIG. 11 shows a side view of a straight ladder mode of the ladder.

FIG. 11 shows a side view of a straight ladder mode of the ladder 10, where the rear section 20 has been rotated essentially 180° relative to the front section 12 from the leaning ladder mode, in the rear section 20 she stands essentially straight upwards from the front section 12 so a user can climb the front section 12 and then continue climbing higher by climbing on the rear section 20. In the straight ladder mode, the telescoping section 28 of the rear section 20 may be positioned as desired depending on the length desired of the overall ladder 10 in the straight ladder mode.

FIG. 12 shows a sectional front perspective view of the telescoping section 28 of the ladder 10 in the straight ladder mode. The telescoping section 28 of the ladder 10 has open storage trays that may be used when the ladder 10 is in the straight ladder mode. FIG. 13 shows a more detailed view of the storage trays, with a storage tray on either side of the telescoping section 28 above the top rung in the straight ladder mode. The storage trays may have tool openings 152, a paintbrush holder 154, and an open tray for holding small objects, such as screws or pins. The ladder top 15, which is attached to the first and second front rails 14, 16 of the front section 12, may also have storage bins 160 in which objects may be placed, as shown in FIG. 14. The ladder top 15 may be directly attached to the first and second front rails 14, 16 by rivets, bolts or screws. The storage bins 160 have lids which open and close, so that in the closed position, the surface of the ladder top 15 will essentially be flat so a user when climbing the ladder 10 in the straight ladder mode may actually step on the ladder top 15, using it as a step, to move on to a rung of the rear section 20 without being concerned about slipping or catching on an opening or a lid. The actuator 50 housing 51 may be directly attached under the second or third rung of the front section 12 from the ladder top 15.

The tray 150 at the bottom of the rear section 20 may be one continuous piece, for instance made of plastic, which extends between the first rear rail 22 and the second rear rail 24. The tray 150 may have tool openings 152 for such tools as screwdrivers, pliers, drills, hammers, wrenches, awls or smart phones. There may be a paintbrush holder 154 and also a bin which can hold nuts, bolts, screws or clips. The tray 150 may alternatively be separated into separate sections, each section disposed adjacent one of the rear rails. The separate sections may hold the bin in one and the tool openings 152, a paintbrush holder 154 in the other. The tray 150, or the tray sections, fit under the bottom rung of the rear section 20 and in the C channel, form by the web and the flanges, of the rear rail to which it is adjacent, so the tray 150 or the tray sections are the most part protected by the rails in the rung. This architecture also serves to protect a user from catching or tripping on a portion of the tray 150, and has no portion of tray 150 extend out beyond the width of the rung or the width of the C channel of the rail in which it is disposed. Additionally, in this way, the tray 150 or the tray sections do not interfere with the telescoping section 28 in sliding up and down.

The tray 150, or the tray sections, may have a rectangular top surface and sidewalls which extend down from the top surface. The tool openings 152, paintbrush holder 154 and bin are disposed in the top surface. The tool openings 152 and paintbrush holder 154 may extend entirely through or close to the bottom of the tray 150, while the bin has a flat bottom surface so the items being held in the bin do not fall through the bin. The tray 150 or tray sections may be riveted or screwed to the rung.

Figure 15:
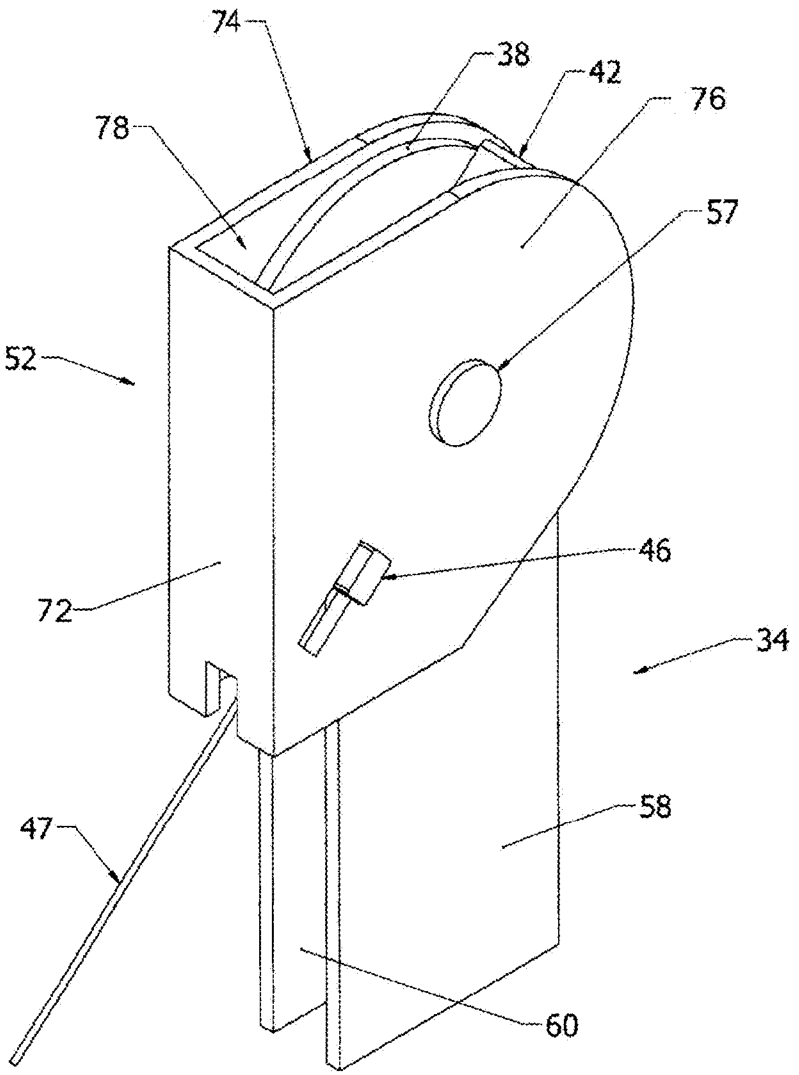
FIG. 15 shows the perspective view of the hinge.
Figure 24B:
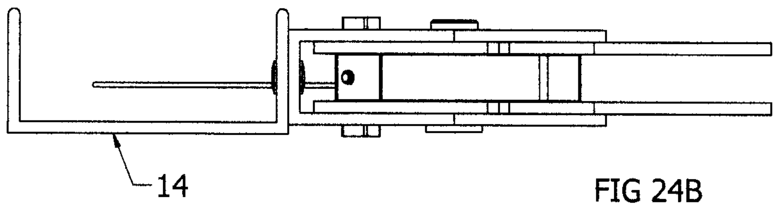
FIG. 24B shows a cross-sectional view of the front rail.
Figure 24A:
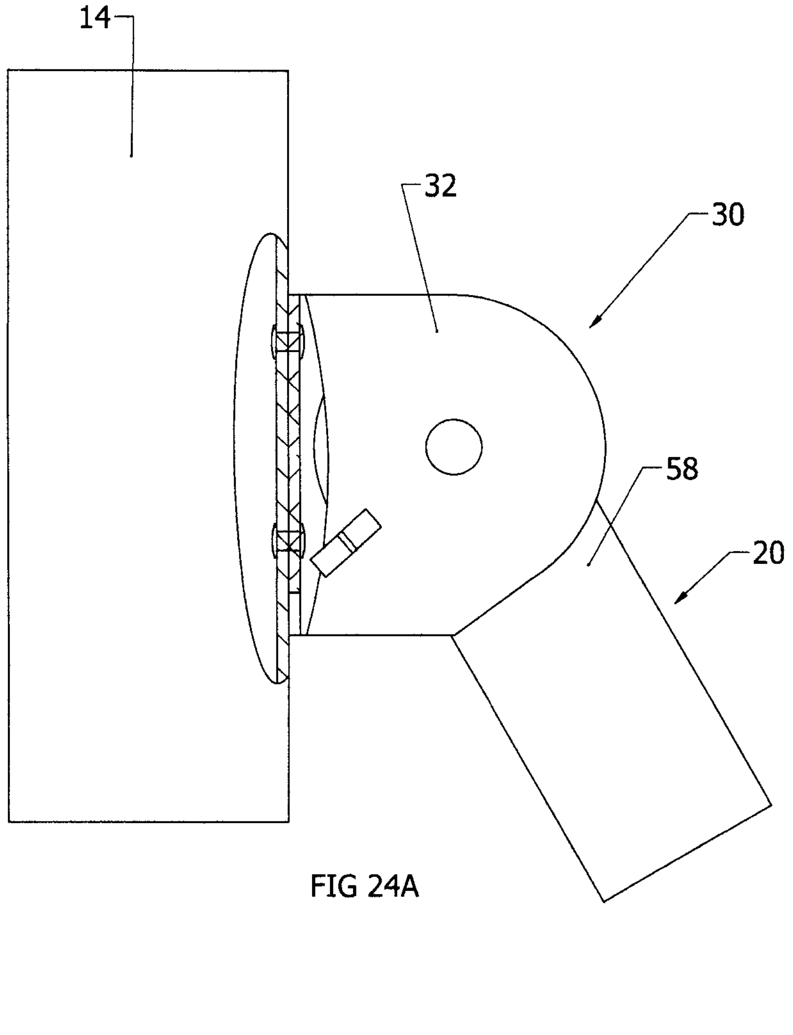
FIG. 24A shows the front side of the hinge bolted to the front rail.
Figure 25:
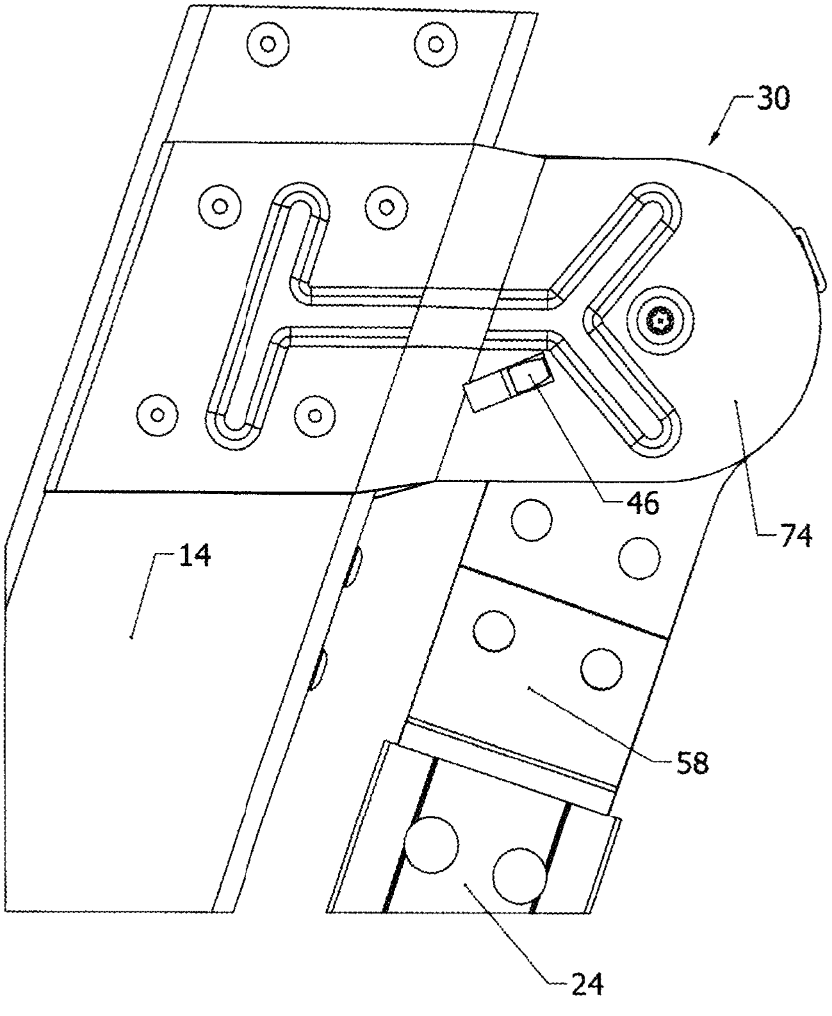
FIG. 25 shows a side view of an alternative frame bolted to the front rail.
Figure 26:
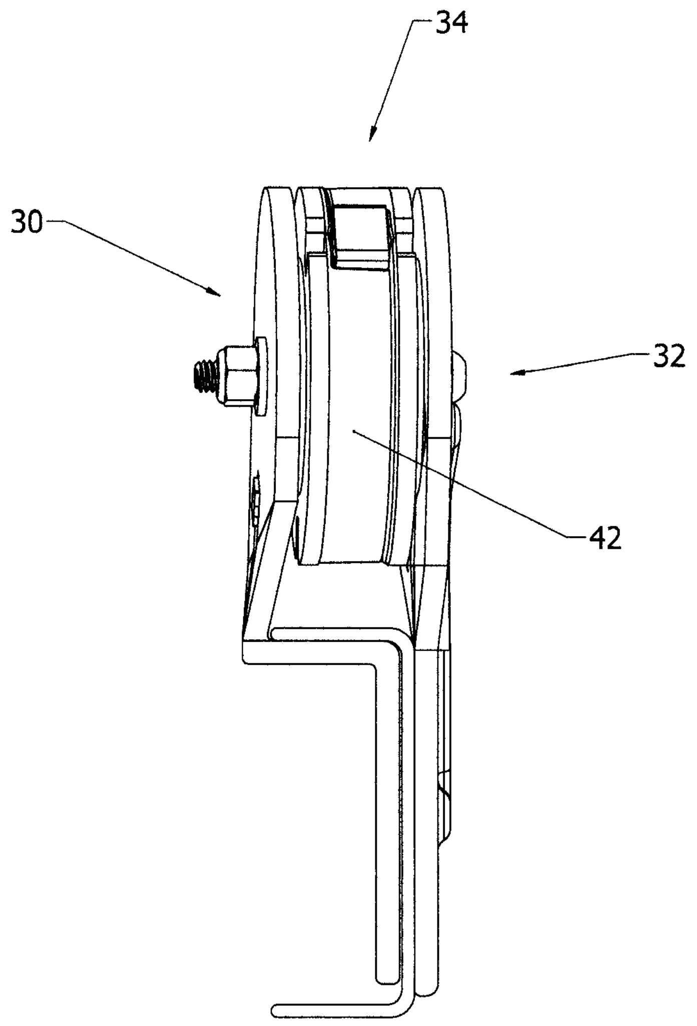
FIG. 26 is a partial perspective view of the frame of FIG. 25.

FIG. 15 shows the perspective view of the hinge. There are two hinges used with the ladder 10. A first hinge 30 attaches to the first front rail 14 and the first rear rail 22. A second hinge 48 attaches to the second front rail 16 and the second rear rail 24. The first hinge 30 has hinge plates that are used to attach the first hinge 30 to the first rear rail 22. The first hinge 30 has a front section 12 which is bolted to an inner flange of the first rear rail 22. Alternatively, the first hinge 30 can be bolted to a bracket, which is in turn bolted to a web of the first rear rail 22. FIGS. 24-26 show various ways how the hinges may be bolted to the front rails.

Figure 16:
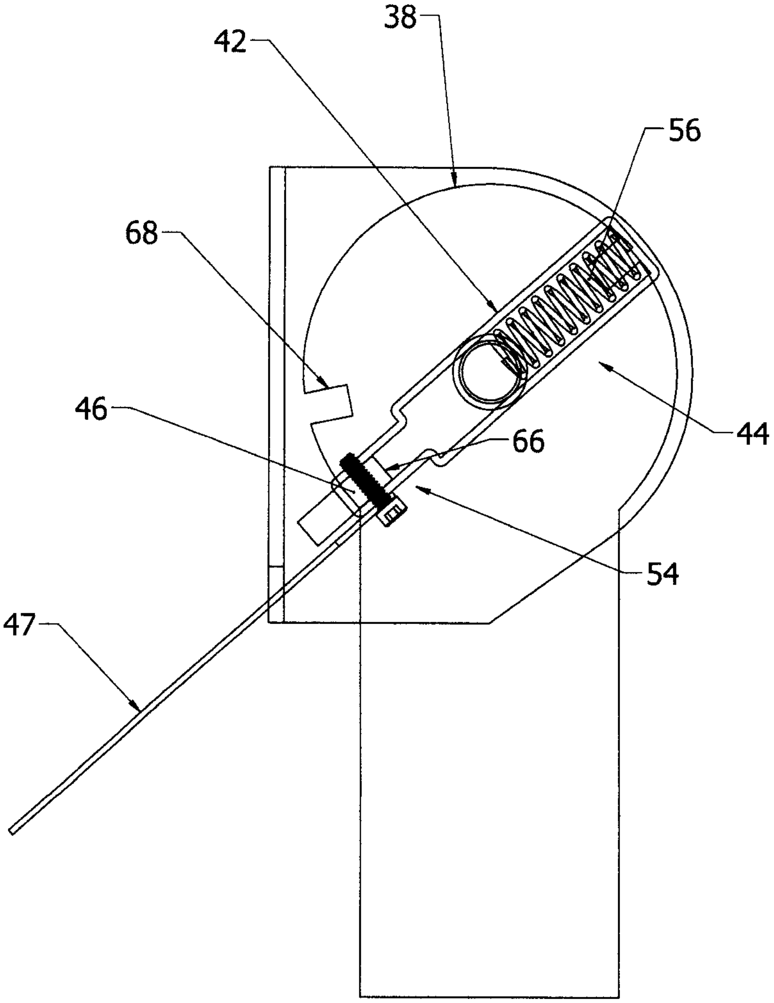
FIG. 16 is a cross-sectional detail showing the hinge in a locked, leaning ladder mode.
Figure 17:
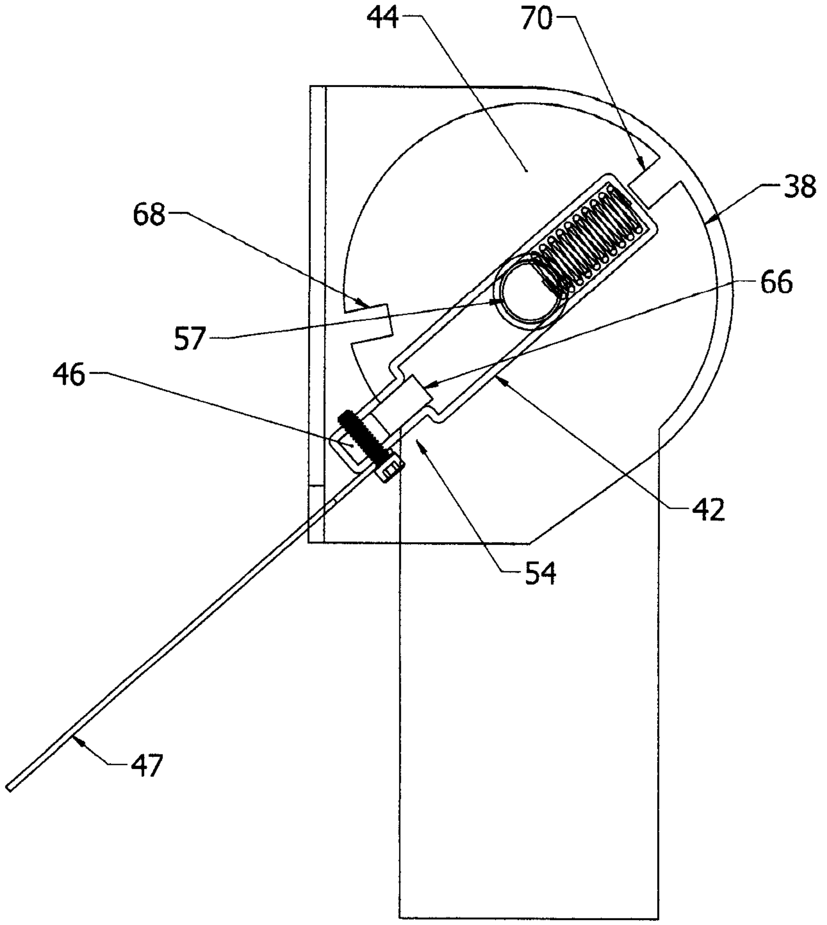
FIG. 17 is a cross-sectional detail showing the hinge in an unlocked, leaning ladder mode.
Figure 18:
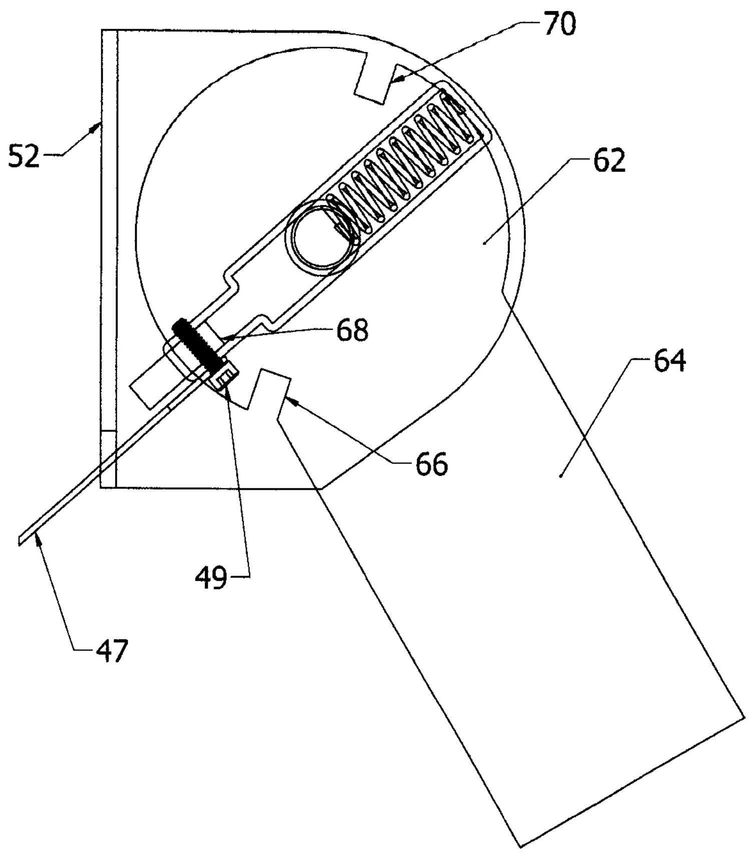
FIG. 18 shows a cross-sectional view of the first hinge in a locked, stepladder mode.
Figure 19:
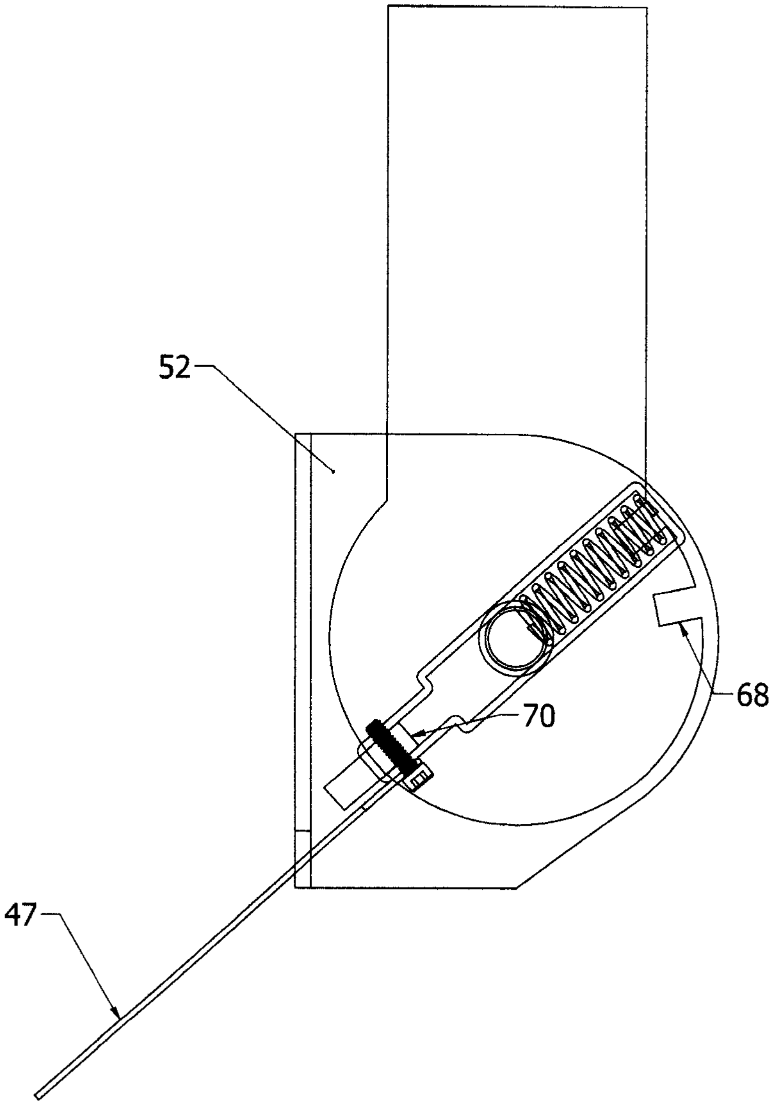
FIG. 19 shows a cross-sectional view of the first hinge in a locked, straight ladder mode.
Figure 20:
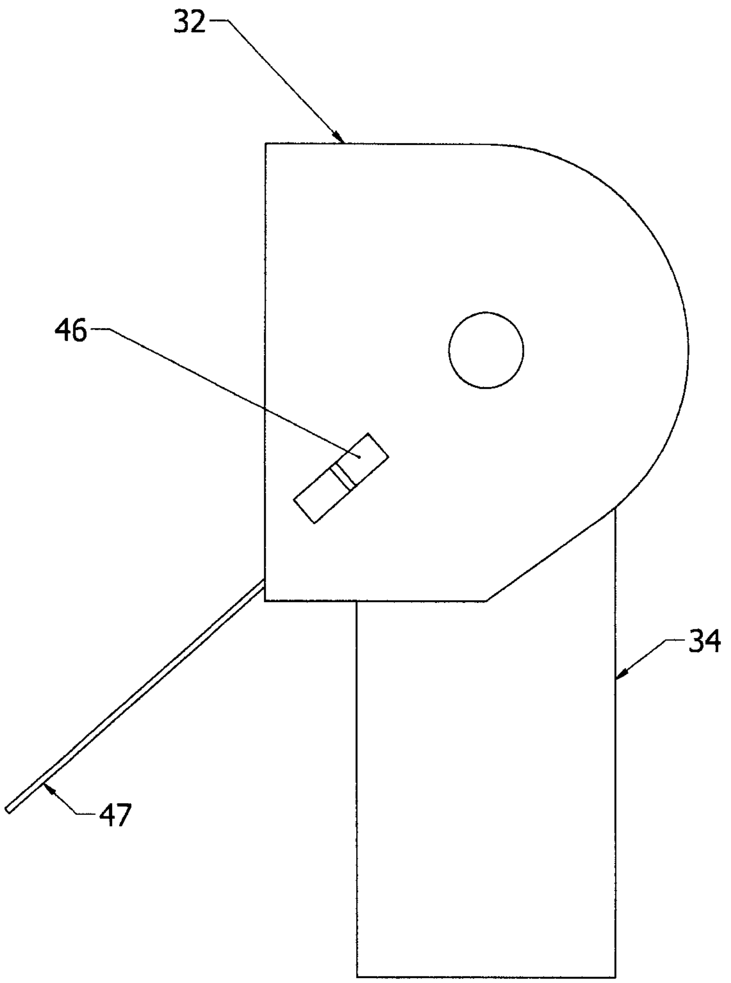
FIG. 20 and FIG. 21A show a side view of the first hinge in a locked and in an unlocked position, respectively.
Figure 21A:
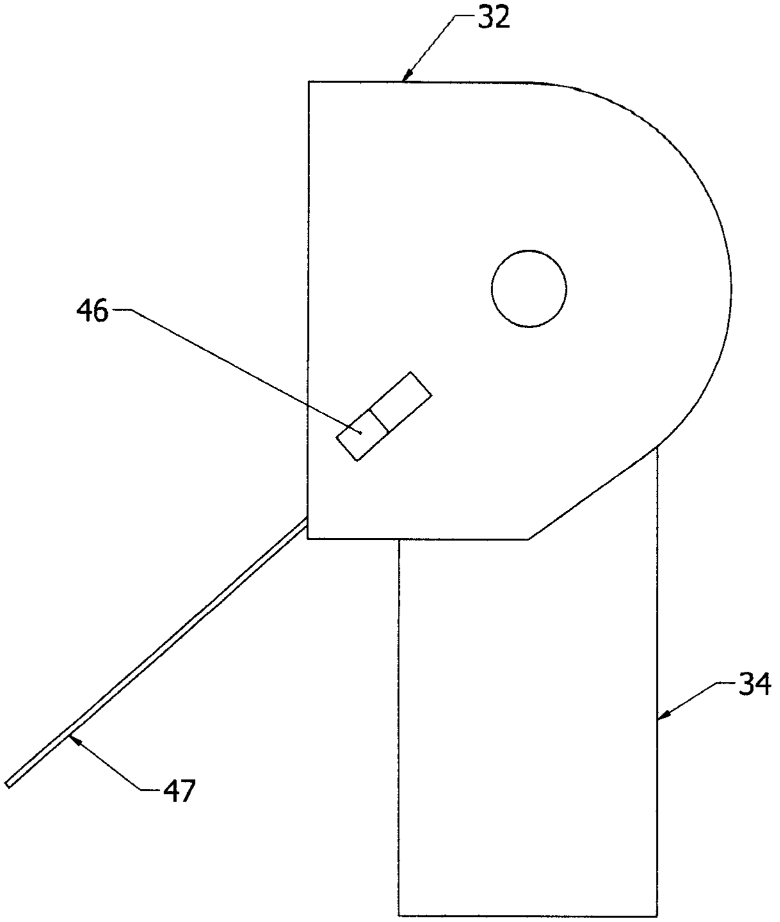
Figure 21B:
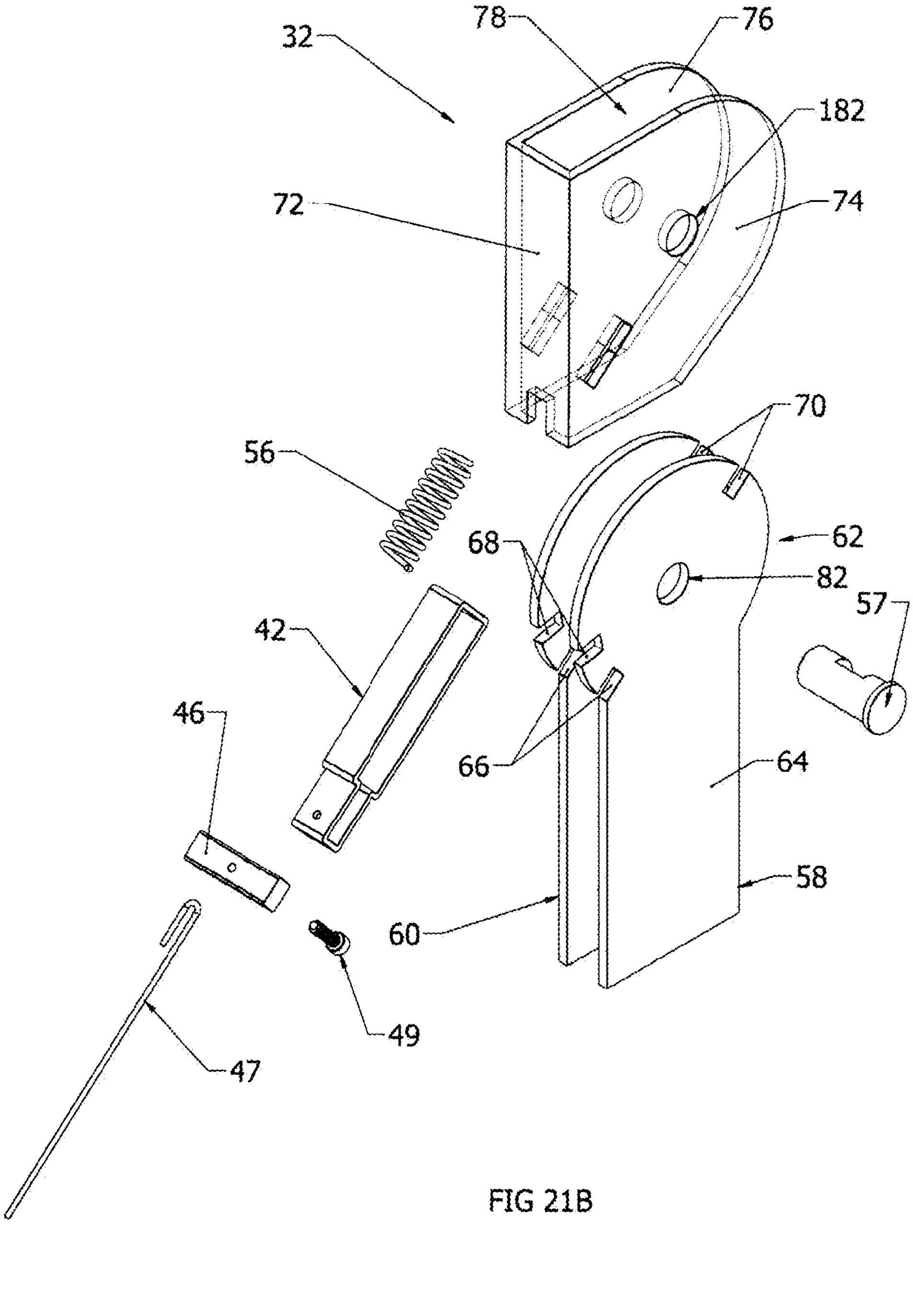
FIG. 21B shows an assembly view of the first hinge.

FIGS. 16 and 17 are cross-sectional details showing the hinge in a locked, leaning ladder mode and in an unlocked, leaning ladder mode, respectively. In the locked mode, as shown in FIG. 16, a lock guide 52 is positioned in between locking plates. A pivot pin 57 extends between the locking plates and a center point and through the lock guide 52. The first rear rail 22 pivots about the pivot pin 57 when moved to different modes and the hinge is unlocked. In the lock guide 52 between the pivot pin 57 and the top surface of the lock guide 52 is a spring 56. There is a lock bar 46 that fits into adjacent and corresponding slots in the lock plates to lock the hinge. A screw 49 or a rivet or a fastener attaches the lock bar 46 to the lock guide 52. The screw 49 also holds the cable to the lock bar 46. In the locked position, the lock bar 46 is seated inside the adjacent corresponding slots 40 and prevents the hinge plates from moving. To unlock the hinge, the cable is pulled causing the lock guide 52 to slide relative to the pivot pin 57 causing the spring 56 to be compressed by the top of the lock guide 52 moving down, and causes the lock bar 46 to separate and come out of the adjacent corresponding slots 40 so there is nothing to prevent the hinge plates from moving, and the hinge plates to which the first rear rail 22 is attached, are free to rotate to align with different adjacent corresponding slots 40 for different modes. See FIG. 17. FIG. 18 shows a cross-sectional view of the first hinge 30 in a locked, stepladder mode. FIG. 19 shows a cross-sectional view of the first hinge 30 in a locked, straight ladder mode. FIG. 20 and FIG. 21A show a side view of the first hinge 30 in a locked and in an unlocked position, respectively. FIG. 21B shows an assembly view of the first hinge 30. The second hinge 48 is the same as the first hinge 30.

FIG. 22 is a front view of the front section 12 having a remote actuator 50 for unlocking both hinges at the same time so the rear section 20 can be changed to different modes. The path of each cable is shown as a dotted line between the actuator 50 and the hinge end extends along the inside of the respective front rail to the respective lock bar 46. FIG. 6 also shows this cable path. A hinge end of the first cable 45 is attached to the lock guide 52, as explained above, and an actuator 50 end of the first cable 45 is attached to the actuator 50. FIG. 23 shows the actuator 50, which is attached to a desired rung, which is easily accessible, and is remote and separate and apart from the first hinge 30. The actuator 50 has a housing 51 which holds a first lever 53 and a second lever 55 that are adjacent and spaced apart from each other. The actuator 50 end of the first cable 45 is attached to the first lever 53 and the actuator 50 end of the second cable 47 is attached to the second lever 55. The cable extends from the first lever 53 through the housing 51 into a cable sheath 49, which protects the cable, to the first hinge 30. When the first and second levers 53, 55 are squeezed together, they cause the first and second cables 45, 47 to become taut and pull on the lock guide 52, causing the hinge to move to an unlocked position, as explained above. When the levers are released, the action of the return spring 56 pulls the first lever 53 back into the un-actuated position. The actuation of the second hinge 48 works the same way.

The present invention pertains to a multi-position ladder 10, as shown in FIGS. 1-11. The ladder 10 comprises a front section 12 having a first front rail 14 and a second front rail 16 and rungs 18 attached to and between the first front rail 14 and the second front rail 16. The ladder 10 comprises a rear section 20 having a first rear rail 22 and a second rear rail 24 and rungs 26 attached to and between the first rear rail 22 and the second rear rail 24. The rear section 20 having a telescoping section 28 attached to the first rear rail 22 and the second rear rail 24 to vary a length of the rear section 20. The ladder 10 comprises a first hinge 30 attached to the first front rail 14 and the first rear rail 22. The first hinge 30 comprises a frame 32 which is fixedly attached to the first front rail 14, as shown in FIG. 21B. The first hinge 30 comprises a rear rail hinge portion 34 fixedly attached to the first rear rail 22 and pivotally attached to the frame 32 to rotate relative to the bracket. The rear rail hinge portion 34 having a perimeter 38 and having a plurality of slots 40 which extend from the perimeter 38. The slot 42 of the plurality of slots 40 corresponding with a desired position of the first rear rail 22 relative to the front. The first hinge 30 comprises a lock assembly 44 disposed in the rear rail hinge portion 34. The lock assembly 44 having a lock bar 46. When the lock bar 46 is disposed in one of the plurality of slots 40, the lock bar 46 locks the first rear rail 22 into a locked state in a desired position relative to the first front rail 14 so the first rear rail 22 cannot move relative to the first front rail 14, as shown in FIG. 20. When the lock bar 46 is disposed outside of one of the plurality of slots 40, the lock bar 46 unlocks the first rear rail 22 into an unlocked state and the first rear rail 22 can move relative to the first front rail

14, as shown in FIG. 21A. The ladder 10 comprises a second hinge 48 attached to the second front rail 16 and the second rear rail 24. Each hinge having a locked state and an unlocked state. The ladder 10 comprises an actuator 50 which is attached to the lock bar 46 to move the lock bar 46 out of one of the plurality of slots 40 in which the lock bar 46 is disposed in a locked state, into an unlocked state.

The lock assembly 44 may include a lock guide 52 disposed in the rear rail hinge portion 34. The lock guide 52 has a bar end 54 in which the lock bar 46 is disposed. The lock assembly 44 may include a spring 56 disposed in the lock guide 52 which biases the lock bar 46 into the locked state by maintaining the lock bar 46 in one of the plurality of slots 40.

The rear rail portion may comprise a first hinge plate 58 and a second hinge plate 60 in spaced relation and in parallel and in alignment with the first hinge plate 58. The first hinge plate 58 and second hinge plate 60 each having a head 62 and a tail 64. The head 62 of the first hinge plate 58 having a first slot 66, second slot 68 and a third slot 70. The head 62 of the second hinge plate 60 having a first slot 66, second slot 68 and a third slot 70 which align with the first slot 66, second slot 68 and third slot 70 of the first hinge plate 58, respectively, so that when the first front rail 14 and the first rear rail 22 are locked in a leaning ladder position, where the first rear rail 22 is adjacent to and in parallel with the first front rail 14, as shown in FIG. 6, the lock bar 46 is disposed in the first slot 66 of the first hinge plate 58 and the second hinge plate 60 in the locked state. When the first front rail 14 and the first rear rail 22 are locked in a stepladder position, as shown in FIG. 7, or the stairway position, as shown in FIG. 8, where the first rear rail 22 forms an acute angle with the first front rail 14, the lock bar 46 is disposed in the second slot 68 of the first hinge plate 58 and the second hinge plate 60 in the locked state. When the first front rail 14 and the first rear rail 22 are locked in a straight ladder position, as shown in FIG. 11, where the first rear rail 22 forms a straight angle with the first front rail 14, the lock bar 46 is disposed in the third slot 70 of the first hinge plate 58 and the second hinge plate 60 in the locked state.

The frame 32 may have a front wall 72 which attaches to the first front rail 14, a first side wall 74 which extends from the front wall 72, and a second side wall 76 which extends from the front wall 72 and is in spaced relation with the first side wall 74 to create a gap 78 between the first side wall 74 and the second side wall 76. The front wall 72 and the first side wall 74 and the second side wall 76 form a C shape, and each are basically flat. The head 62 of the first hinge plate 58 and the head 62 of the second hinge plate 60 are disposed in the gap 78 between the first side wall 74 and the second side wall 76. The first side wall 74 and the second side wall 76 and the head 62 of the first and second hinge plates 58, 60 each have a pivot hole 80 which align. The ladder 10 may include a pivot pin 57 which extends through a pivot hole 182 of the first and second side walls 74, 76 and the pivot hole 82 of the head 62 of the first and second hinge plates 58, 60 to attach and hold the frame 32 and the first and second hinge plates 58, 60 together.

The tail 64 of the first hinge plate 58 and the tail 64 of the second hinge plate 60 may attach to the first rear rail 22. The lock guide 52 may be disposed between the head 62 of the first hinge plate 58 in the head 62 of second hinge plate 60 and the pivot pin 57 extends through the lock guide 52. The spring 56 may be disposed between the pivot pin 57 and an opposite end of the lock guide 52 from the bar end 54 of the lock guide 52.

The actuator 50 may include a first connector 84, such as a cable, attached to the lock bar 46, as shown in FIG. 5 and FIG. 23. When the actuator 50 is actuated, the first connector 84 pulls the lock bar 46 which causes the lock bar 46 to move down out of one of the plurality of slots 40 and out of the lock state and into the unlocked state. When the first connector 84 pulls the lock bar 46 down, the lock guide 52 is pulled down causing the opposite end of the lock guide 52 to compress the spring 56 against the pivot pin 57, so that when the actuator 50 is released, the compressed spring 56 expands, pushing against the pivot pin 57 and the opposite end of the lock guide 52 causing the lock guide 52 to move back up and the lock bar 46 to move into one of the plurality of slots 40 and back into the locked state.

The first slot 66 and second slot 68 of the head 62 of the first hinge plate 58 may be adjacent each other and disposed in a lower left side of the head 62 of the first hinge plate 58 closest to the first wall when the first front rail 14 and the first rear rail 22 are in the leaning ladder position, and the third slot 70 of the first hinge plate 58 is disposed diametrically opposite the first slot 66.

The first side wall 74 may have a first bar groove 86 and the second side wall 76 may have a second bar groove in alignment with the first bar groove 86, as shown in FIGS. 20, 21A and 21B. The lock bar 46 is disposed in the first bar groove 86 and the second bar groove. When the lock bar 46 is disposed in either the first or second or third slots 66, 68, 70, the lock bar 46 is positioned at a top of the first bar groove 86 and the second bar groove. When the first front rail 14 and the second front rail 16 are in the unlocked state, the lock bar 46 is positioned at a bottom of the first bar groove 86 and the second bar groove.

The first bar groove 86 and the second bar groove may be in linear alignment with the first slot 66 when the first front rail 14 and the first rear rail 22 are locked in the leaning ladder position. The actuator 50 when actuated may simultaneously move the first and second hinges 30, 48 between the lock state and the unlocked state. The ladder 10 may include a second connector 85 attached to the actuator 50 and to the second hinge 48. When the actuator 50 is actuated, the first connector 84 is pulled causing the first hinge 30 to move between the locked state in the unlocked state, and the second connector 85 is pulled causing the second hinge 48 to move between the locked state in the unlocked state.

In an alternative embodiment, an actuator, such as actuator 150 may include a shelf 90 having a first opening 92 and a second opening 94, a plate 98, a first assembly 100 attached to the first connector 84 and a second assembly 102 attached to the second connector 85 as shown in FIGS. 27-35. The first assembly 100 having a first base 104 attached to the first connector 84 and attached with a first fastener 106 to the plate 98, with the shelf 90 disposed between the first base 104 and the plate 98. The first fastener 106 disposed in the first opening 92. The first assembly 100 having a first actuation lever 108 attached to the first base 104 and extending essentially perpendicular from the first base 104. The second assembly 102 having a second base 110 attached to the second connector 85 and attached with a second fastener 114 to the plate 98, with the shelf 90 disposed between the second base 110 and the plate 98. The second fastener 114 disposed in the second opening 94. The second assembly 102 having a second actuation lever 116 attached to the second base 110 and extending essentially perpendicular from the second base 110. The shelf 90 of the housing 51 of the alternative embodiment is attached adjacent to and below the ladder top 15 with mounting brackets 184, 186 and housing fasteners 96 as shown in FIGS. 27-29 and 41. A first mounting bracket 184 is directly attached to the first front rail 14 and to the underside of the shelf 90. A second mounting bracket 186 is directly attached to the second front rail 16 and to the underside of the shelf 90. Housing fasteners 96 directly attach the first mounting bracket to the first front rail 14 and the shelf 90, and housing fasteners 96 also directly attach the second mounting bracket 186 to the second front rail 16 and the shelf 90.

Figures 30, 31:
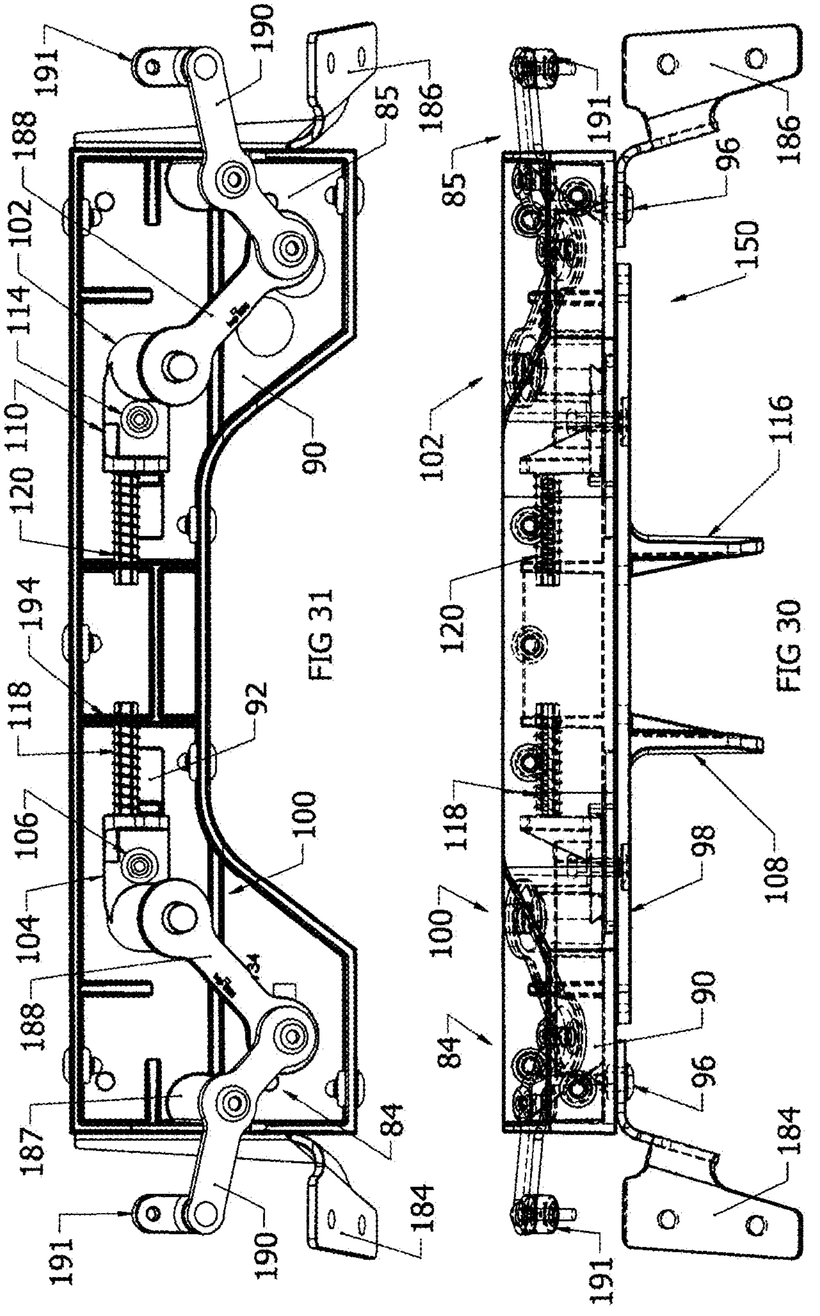
FIG. 30 is a front view of the alternative embodiment of the actuator when the hinges are locked.
FIG. 31 is an overhead view of the alternative embodiment of the actuator when the hinges are locked.
Figure 33:
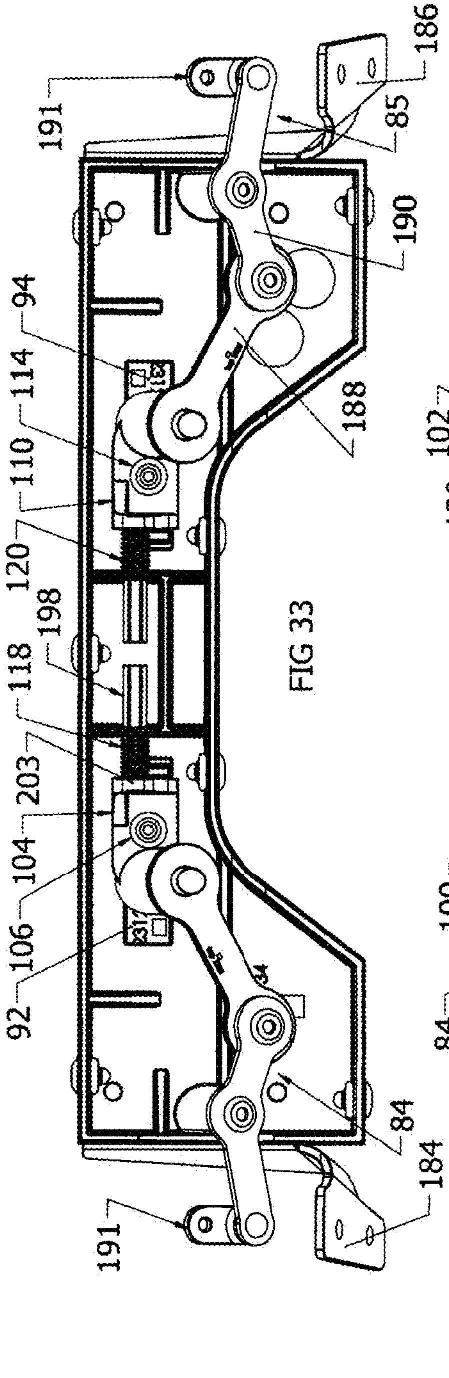
FIG. 33 is an overhead view of the alternative embodiment of the actuator when the hinges are unlocked.
Figure 32:
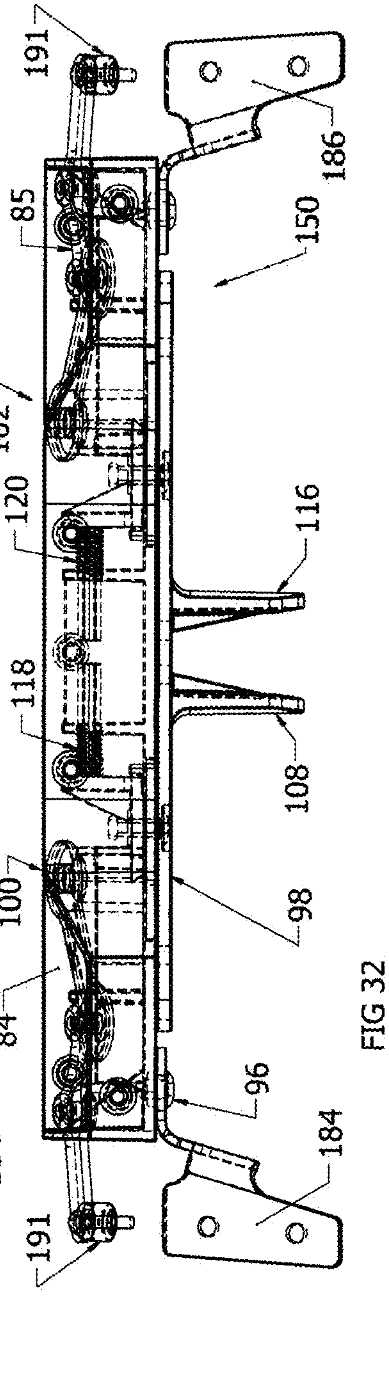
FIG. 32 is a front view of the alternative embodiment of the actuator when the hinges are unlocked.

The actuator 150 may include a first spring 118 attached to the first actuation lever 108 and a second spring 120 attached to the second actuation lever 116. When the actuator 150 is actuated causing the first hinge 30 and the second hinge 48 to move to an unlocked state, the first spring 118 and the second spring 120 are compressed by the first actuation lever 108 and second actuation lever 116 moving toward each other along the first opening 92 and the second opening 94, respectively, into an unlocked state increasing a bias force against the first and second actuation levers 108, 116, as shown in FIGS. 32 and 33. When the first actuation lever 108 and second actuation lever 116 are released, as shown in FIGS. 30 and 31, the bias force from the springs causes the first hinge 30 and second hinge 48 to move back along the first opening 92 and the second opening 94, respectively, into the locked state and for the actuation levers to move back into a locked state and be maintained in the locked state under the bias force of the first and second springs 118, 120. The connector may be a cable or linkage.

When the first hinge 30 is attached with the actuator 150, the operation of the hinge in conjunction with the actuator 150 is the same as the actuator 50. Instead of a cable though with the first actuator 50 embodiment described above, there is a linkage in the actuator 150 comprising a first link 188 and a second link 190. The first link 188 is fixedly attached to the first base 104 and to the second link 190. The second link 190 is fixedly attached to the lock bar 46 at a tip 191 of the second link 190. The second link 190 at its center is rotatably and fixedly attached to a post 187, for instance, with a rivet or screw. The post 187 is fixedly attached to the shelf 90 with a rivet or screw 49. The second link 190 rotates about the post 187. When the first actuation lever 108 and the second actuation lever 116 are squeezed together, the first link 188 is pulled toward the center of the shelf 90, causing the second link 190 to rotate about the post 187 and the tip 191 to move downwards, pulling the lock bar 46 out of whichever slot of the first hinge 30 the lock bar 46 is in, unlocking the first hinge 30. When the first actuation lever 108 is released, the first spring 118 decompresses and moves the first base 104 along the first opening 92 back to the lock position, in turn causing the first link 188 to move the end of the second link 190 to which the first link 188 is attached downward, causing the second link 190 to rotate about its center and moving the tip 191 upwards, and thus the lock bar 46 attached to the tip 191 into the desired slot it is before, where it locks the first hinge 30 in place. The first link 188 is straight, and the second link 190 has a slight v shape with the apex of the v shape rotatably and fixedly attached to the post 187 so the second link 190 rotates about the post 187 causing the tip 191 to move upwards or downwards. The first spring 118 is wrapped around a pole 198 which extends from a stem 203 of the first base 104 and is disposed in a hole in a buttress 194 of the shelf 90, as shown in FIG. 31. When the first actuation lever 108 is squeezed inwards, the pole 198 extends through the buttress 194, but the first spring 118 is stopped by the buttress 194, causing the first spring 118 to compress, as shown in FIG. 33. When the first actuation lever 108 is released, the pole 198 moves back to the locked position as shown in FIG. 31. The same applies for the operation of the second hinge 48.

Figure 27:
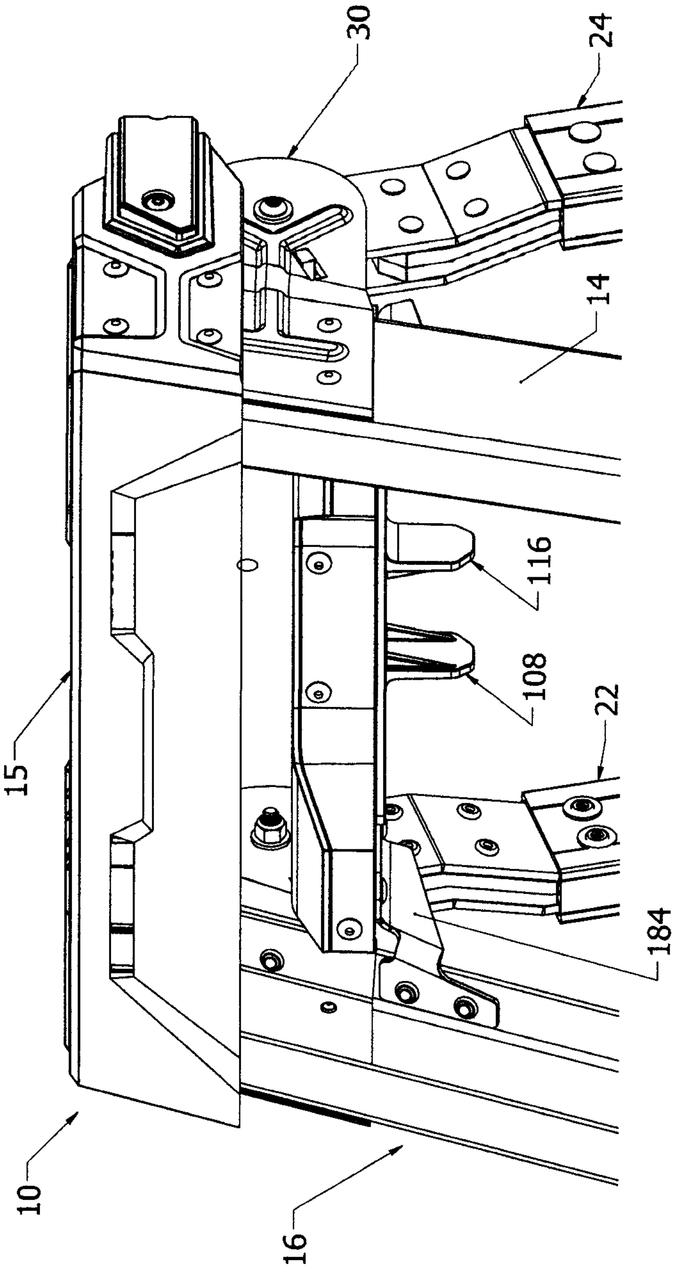
FIG. 27 is a perspective front side view of an alternative embodiment of the actuator with the ladder in stepladder mode.
Figure 28:
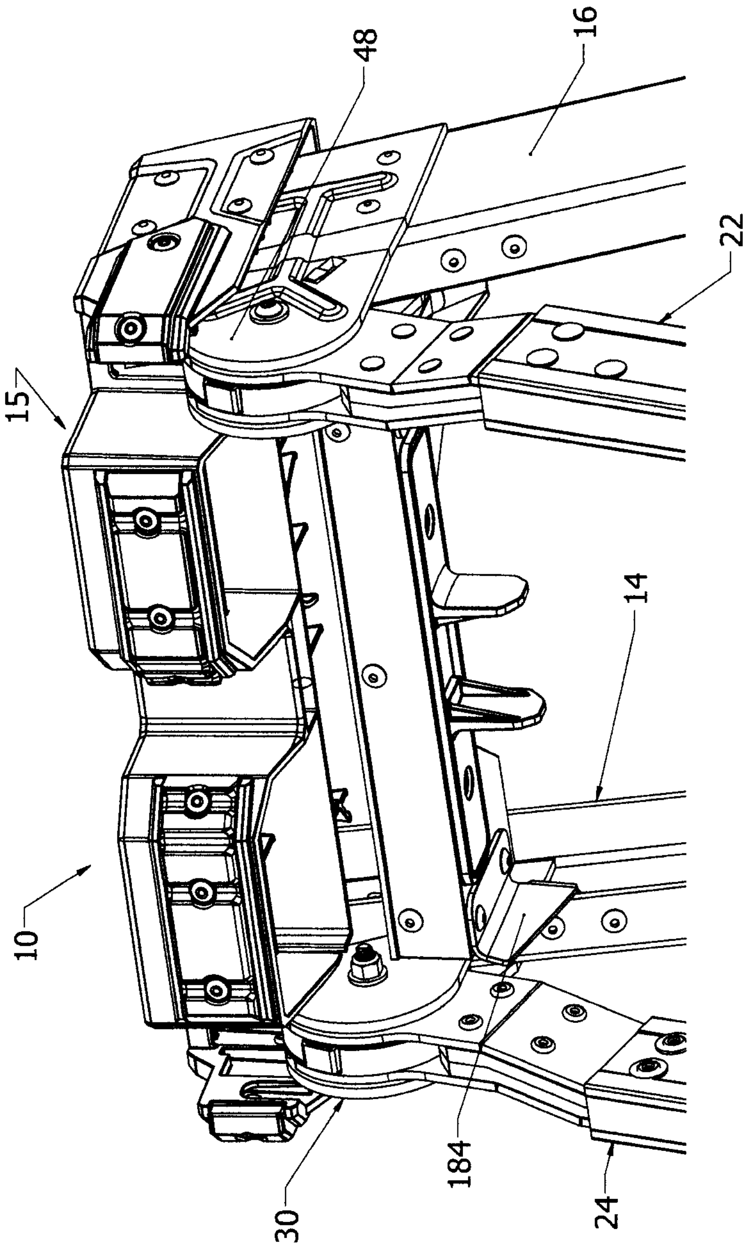
FIG. 28 is a perspective backside view of the alternative embodiment of the actuator with the ladder in the stepladder mode.
Figure 29:
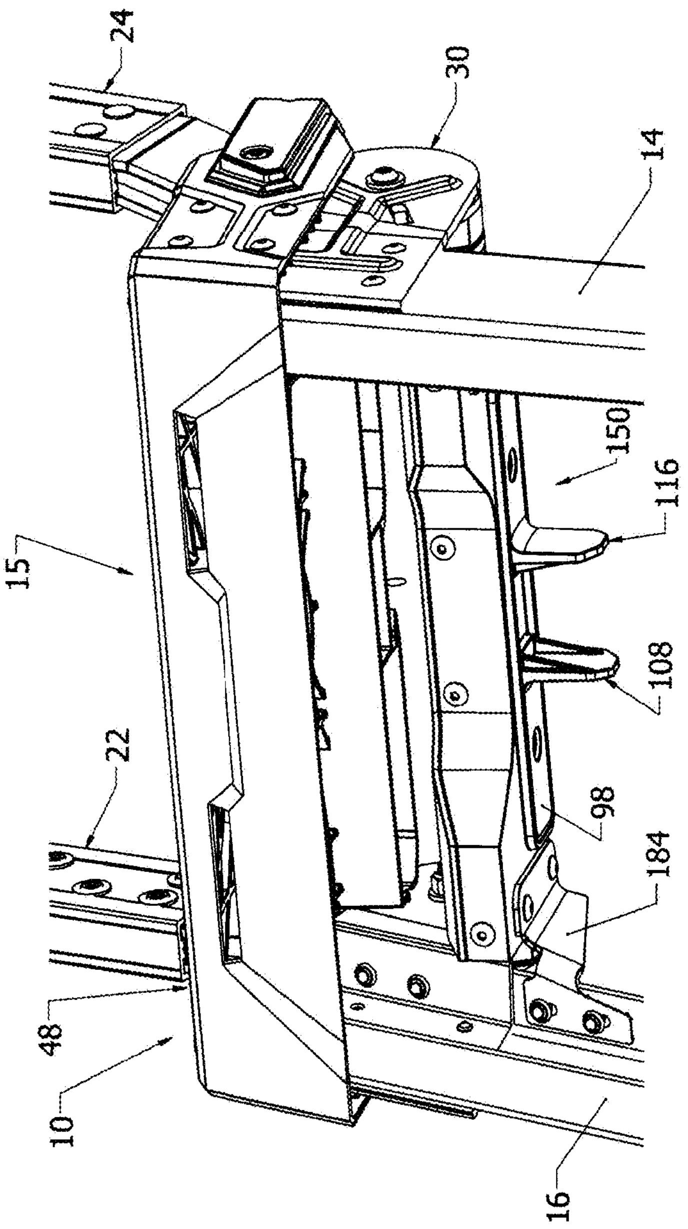
FIG. 29 is a front side view of the alternative embodiment of the actuator in the straight ladder mode.

FIG. 27 is a perspective front side view of the actuator 150 with the ladder 10 in stepladder mode. FIG. 28 is a perspective backside view of the actuator 150 with the ladder 10 in the stepladder mode. FIG. 29 is a front side view of the actuator 150 in the straight ladder mode. FIG. 30 is a front view of the actuator 150 when the hinges are locked. FIG. 31 is an overhead view of the actuator 150 when the hinges are locked. FIG. 32 is a front view of the actuator 150 when the hinges are unlocked. FIG. 33 is an overhead view of the actuator 150 when the hinges are unlocked.

Figure 34:
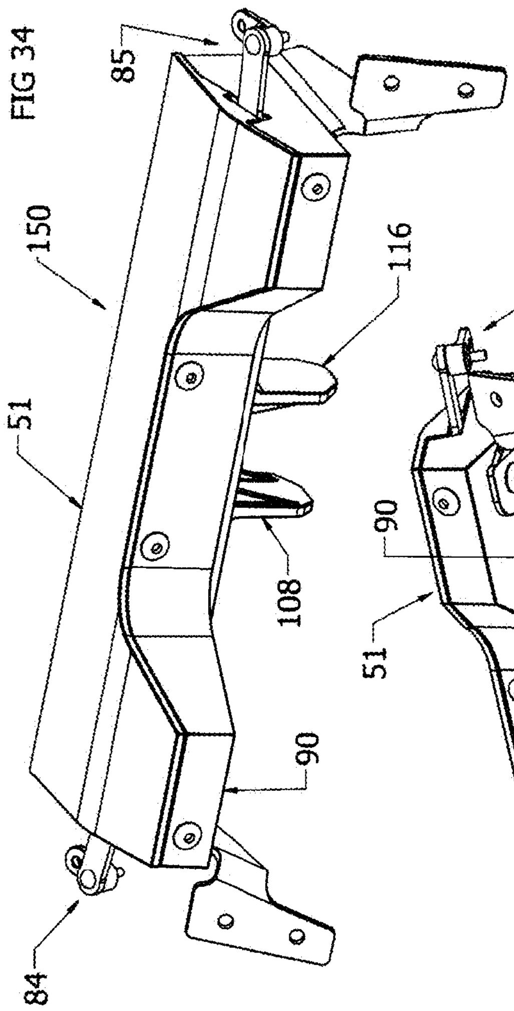
FIG. 34 is a perspective overhead view of the housing of the alternative embodiment of the actuator when the hinges are locked.
Figure 35:
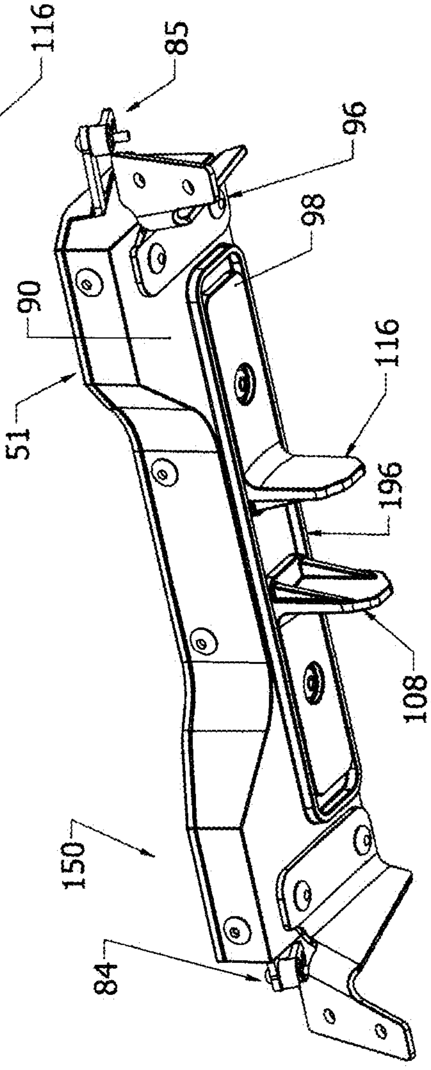
FIG. 35 is a perspective underside view of the housing of the alternative embodiment of the actuator when the hinges are locked.
Figure 36:
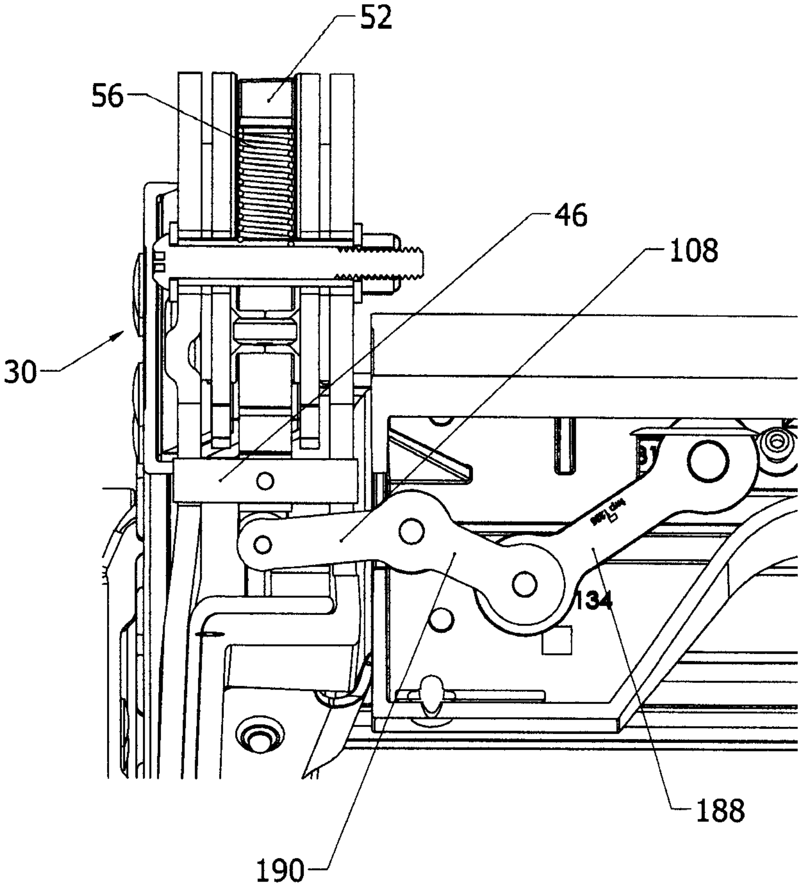
FIG. 36 is a partial cross-sectional view of a portion of an actuator.
Figure 37:
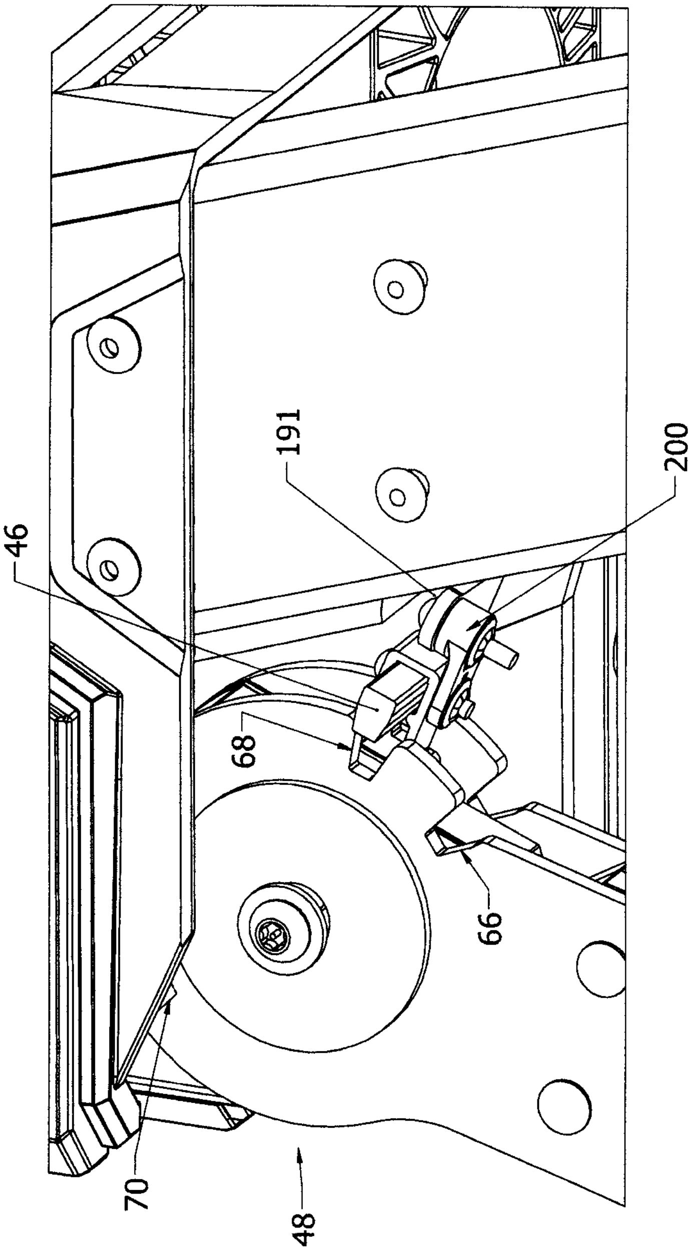
FIG. 37 is a cross-sectional view of the first actuation lever attached to the lock bar.

FIG. 34 is a perspective overhead view of the housing of the actuator 150 when the hinges are locked. The second link 190 of each connector extends out the side of the housing 51 to connect with the lock bar 46. FIG. 35 is a perspective underside view of the housing 51 of the actuator 150 when the hinges are locked. The actuation levers extend down through the plate 98. There is a space 196 in the plate 98 between the actuation levers which allows the actuation levers to be squeezed together without any interference by the plate 98. FIG. 36 is a cross-sectional view of a portion of the actuator 150, including the first actuation lever 108 attached to the lock bar 46. FIG. 37 is a perspective view of the second hinge 48 with a portion removed, and including the lock bar 46.

Figure 38:
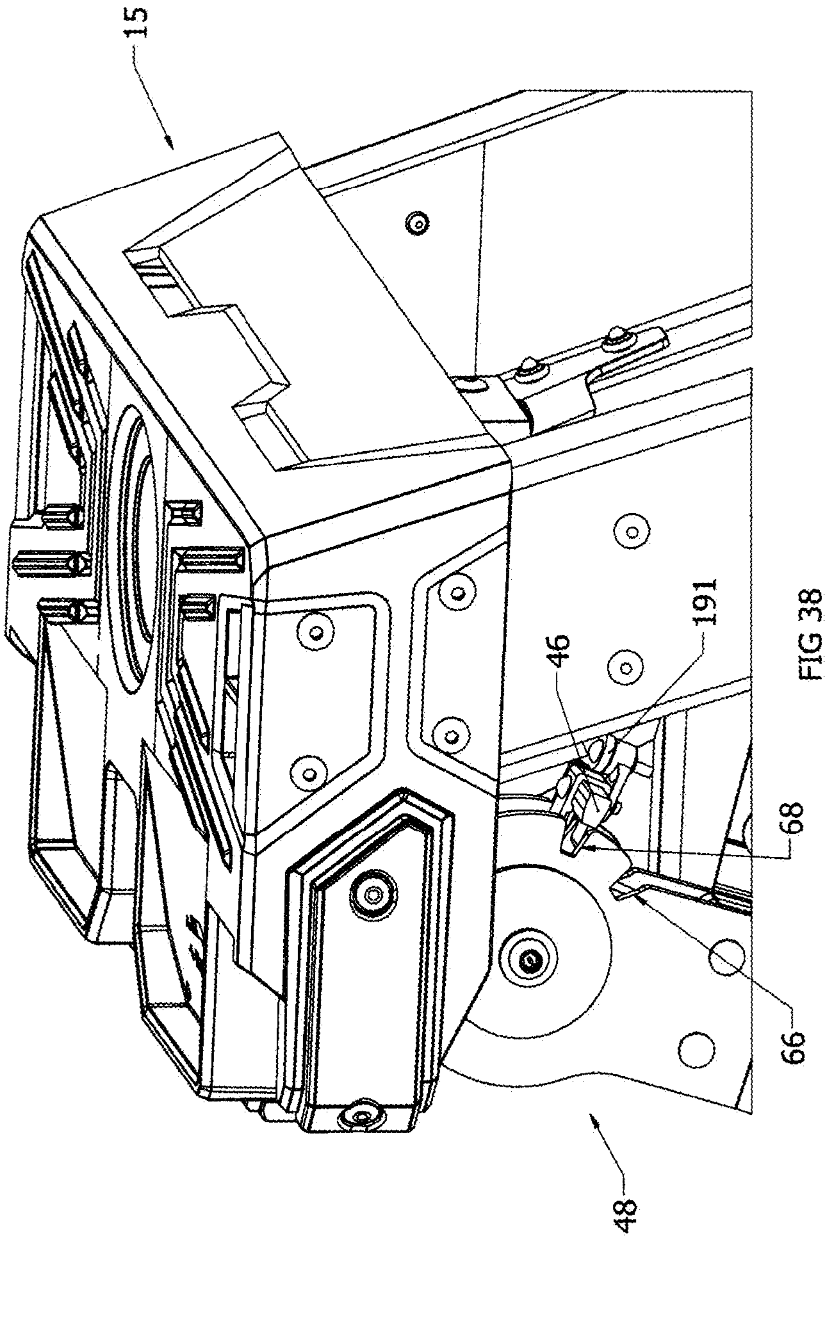
FIG. 38 shows a linker between the first actuation lever and the lock bar.
Figure 39:
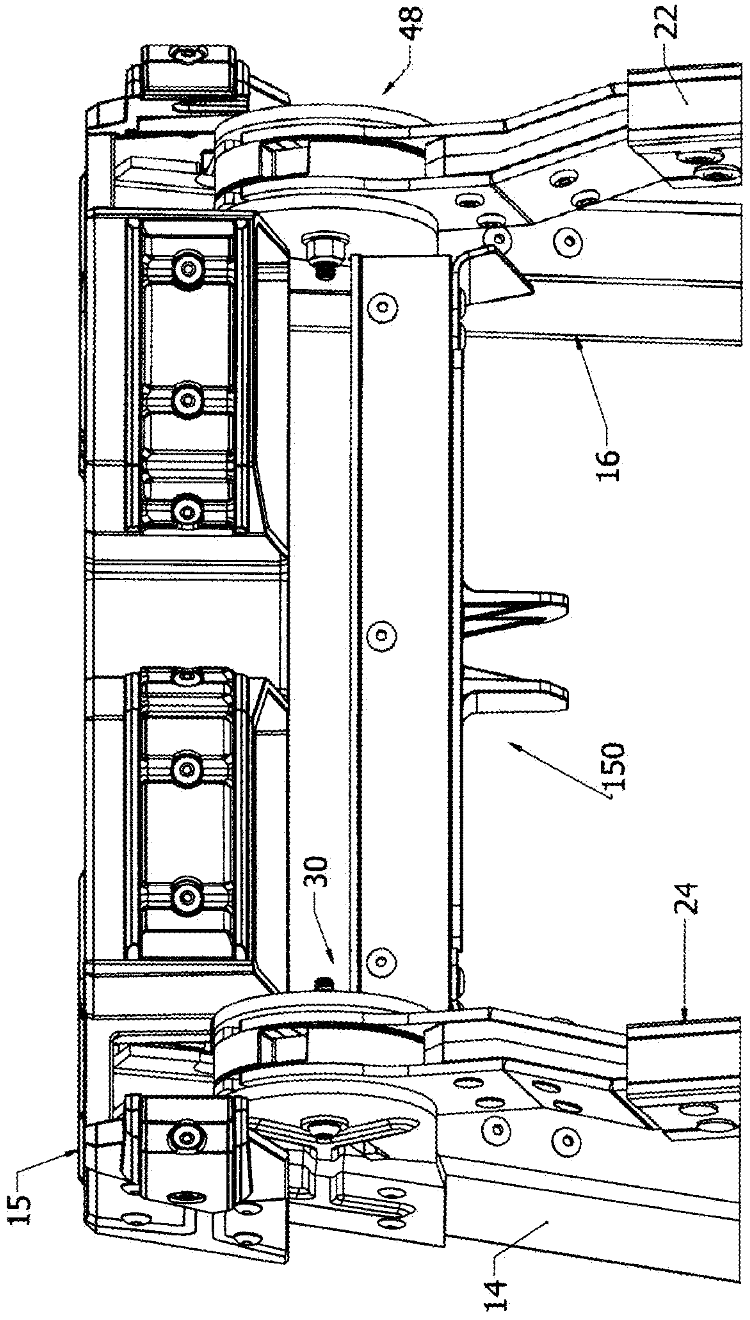
FIG. 39 shows a perspective front side view of the upper portion of the ladder.
Figure 40:
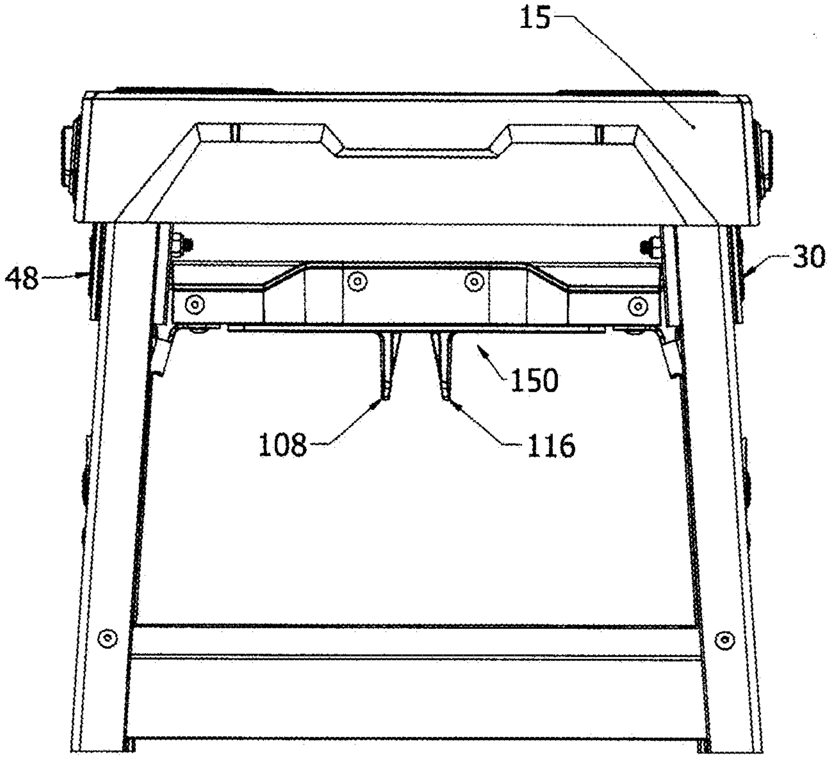
FIG. 40 shows a perspective rear view of the upper portion of the ladder.
Figure 41:
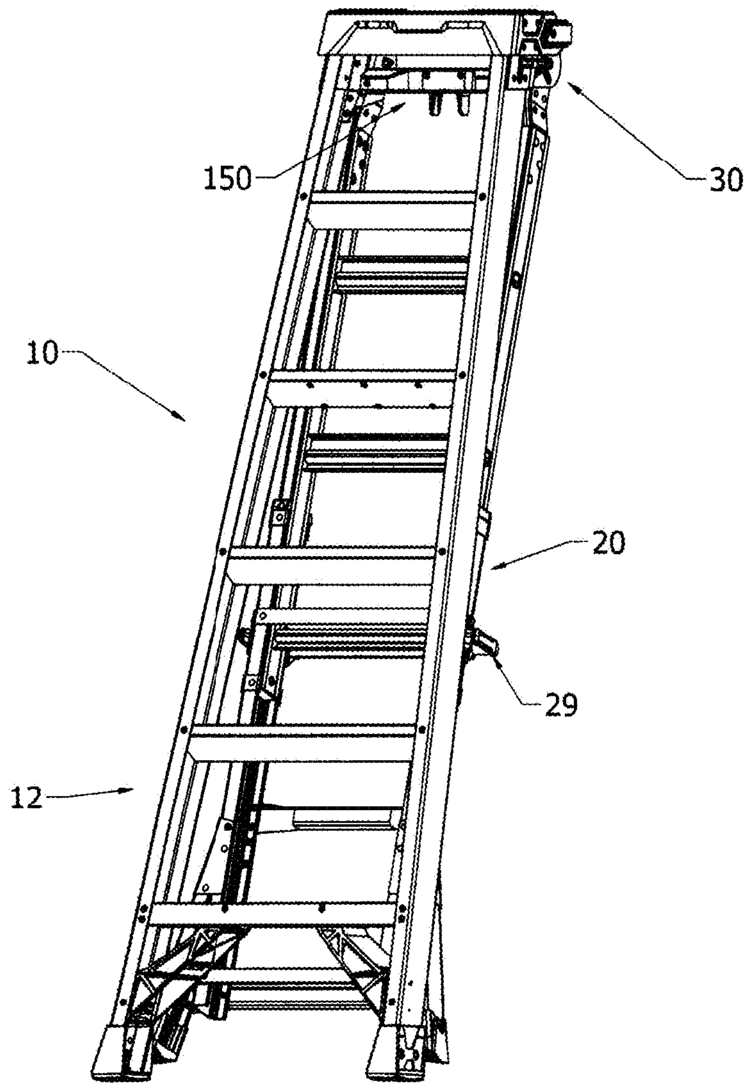
FIG. 41 shows a front view of the upper portion of the ladder.

A linkage 200 is disposed between the first actuation lever 108 and the lock bar 46. FIG. 38 illustrates the linkage 200, which attaches to both the lock bar 46 and to the first actuation lever 108 to fixedly attach the first actuation lever 108 to the lock bar 46, for instance, with a rivet or screw 49. FIG. 39 shows a perspective front side view of the upper portion of the ladder 10. FIG. 40 shows a perspective rear view of the upper portion of the ladder 10. FIG. 41 shows a front view of the upper portion of the ladder 10.

The present invention pertains to a hinge attached to a first front rail 14 and a first rear rail 22. The hinge comprises a frame 32 which is fixedly attached to the first front rail 14. The hinge comprises a rear rail hinge portion 34 fixedly attached to the first rear rail 22 and pivotally attached to the frame 32 to rotate relative to the frame 32. The rear rail hinge portion 34 having a perimeter 38 and having a plurality of slots 40 which extend from the perimeter 38. The slot 42 of the plurality of slots 40 corresponding with a desired position of the first rear rail 22 relative to the front. The hinge comprises a lock assembly 44 disposed in the rear rail hinge portion 34, the lock assembly 44 having a lock bar 46, when the lock bar 46 is disposed in one of the plurality of slots 40, the lock bar 46 locks the first rear rail 22 into a locked state in a desired position relative to the first front rail 14 so the first rear rail 22 cannot move relative to the first front rail 14, when the lock bar 46 is disposed outside of one of the plurality of slots 40, the lock bar 46 unlocks the first rear rail 22 into an unlocked state and the first rear rail 22 can move relative to the first front rail 14.

The present invention pertains to a method for using a multi-position ladder 10. The method comprises the steps of actuating an actuator 50 attached to a front section 12 of the ladder 10 causing a first hinge 30 to move between a locked state and an unlocked state and a second hinge 48 to move between a locked state and an unlocked state. The first hinge 30 attached to a first front rail 14 of the front section 12 of the ladder 10 and a first rear rail 22 of a rear section 20 of the ladder 10. The second hinge 48 attached to a second front rail 16 of the front section 12 of the ladder 10 and a second rear rail 24 of the rear section 20 of the ladder 10. The actuator 50 remote separate and apart from the first hinge 30 and the second hinge 48. The rear section 20 having a telescoping section 28. There is the step of moving the rear section 20 relative to the front section 12 about the first and second hinges 30, 48 when the first and second hinges 30, 48 are in the unlocked state to either a leaning ladder mode, a stepladder mode, a stairway ladder mode, and a straight ladder mode. There is the step of locking the rear section 20 relative to the front section 12 in the desired ladder mode.

The present invention pertains to a method for producing a multi-position ladder 10. The method comprises the steps of attaching an actuator 50 to a rung on a front section 12 of the ladder 10. The actuator 50 causes a first hinge 30 and a second hinge 48 of the ladder 10 to move between a locked state and an unlocked state. There is the step of attaching a first cable 45 to the actuator 50 and the first hinge 30 and a second cable 47 to the actuator 50 and the second hinge 48, the first hinge 30 and the second hinge 48 attached to the front section 12 and a rear section 20 of the ladder 10.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder comprising:

a front section having a first front rail and a second front rail and rungs attached to and extending between the first front rail and the second front rail;

a rear section having a first rear rail and a second rear rail and rungs attached to and extending between the first rear rail and the second rear rail, the rear section having a telescoping section attached to the first rear rail and the second rear rail to vary a length of the rear section;

a ladder top attached to the front section and to the first rear rail and the second rear rail of the rear section;

an actuator attached to the first front rail and the second front rail above a top front section rung and below the ladder top;

the actuator including a first lever coupled to a first spring and a first linkage and a second lever coupled to a second spring and a second linkage, wherein the first linkage has a first lock bar coupled thereto and the second linkage has a second lock bar coupled thereto;

the first rear rail is coupled to the ladder via a first hinge and the second rear rail is coupled to the ladder via a second hinge; and the first rear rail has a first pair of hinge plates and the second rear rail has a second pair of hinge plates, the first pair of hinge plates and the second pair of hinge plates having a plurality of slots around a perimeter thereof, the plurality of slots corresponding to one or more desired positions of the rear section relative to the front section;

wherein moving the first lever and the second lever moves the first lock bar and the second lock bar into and out of engagement with the plurality of slots;

wherein the first lock bar and the second lock bar are moved simultaneously in an upward and downward relationship relatively to the ladder top to selectively engage one of the plurality of slots on the first pair of hinge plates and the second pair of hinge plates; and wherein when the first lock bar and the second lock bar are disposed within one of the plurality of slots on respective ones of the first pair of hinge plates and the second pair of hinge plates, the rear section is secured relative to the front section in a locked state and when the first lock bar and the second lock bar are disengaged from the plurality of slots then the rear section is rotatable relative to the front section in an unlocked state.

2. The ladder of claim 1 further comprising a first lock spring associated with the first hinge and a second lock spring associated with the second hinge, wherein the first lock spring and the second lock spring bias the first and second lock bars, respectively, into engagement with one of the plurality of slots.

3. The ladder of claim 2 wherein when the actuator is actuated, the first linkage and the second linkage pulls the respective first lock bar and the second lock bar which causes the first and the second lock bar to move down and out of one of the plurality of slots, out of the locked state, and into the unlocked state, when the first and the second linkage pulls the respective first lock bar and the second lock bar down, lock guides that are coupled to the first and the second lock bars are pulled down causing an opposite end of the lock guides to compress the first and second lock springs against a pivot pin, such that when the actuator is released, the compressed first lock spring and second lock springs expand, pushing against the pivot pin and the opposite end of the lock guides causing the lock guides to move back up and the first and the second lock bars to move into one of the plurality of slots and back into the locked state.

4. The ladder of claim 2 wherein when the first and second lock bars are moved out of one of the plurality of slots, the first and the second linkages are pulled down causing an opposite end of the first and the second linkage to compress the first and second lock spring against a pivot pin, such that when the actuator is released, the compressed first and second lock springs expand, pushing against the pivot pin and the opposite end of the first and the second linkage causing the linkages to move back up and the lock bars to move into one of the plurality of slots and back into the locked state.

5. The ladder of claim 1 wherein the first pair of hinge plates and the second pair of hinge plates includes a first slot, second slot and a third slot; wherein the first slot corresponds to a leaning ladder position, wherein the second slot corresponds to a stepladder position, and wherein the third slot corresponds to a straight ladder position.

6. The ladder of claim 1 wherein when the actuator is actuated, the first spring and the second spring are compressed by the first lever and the second lever, and unlock the front section, and when the first lever and the second lever are released, a biasing force from the first spring and the second spring causes the first hinge and the second hinge to lock the front section and remain in the locked state due to the biasing force of the first spring and the second spring.

7. The ladder of claim 1 wherein the first linkage and the second linkage comprises an inner portion attached to the respective one of the first spring or the second spring, and an outer portion attached to the inner portion, the outer portion including a tip attached to the lock bar.

8. The ladder of claim 1 wherein the first linkage and the second linkage include a post, and wherein a portion of the first linkage and the second linkage rotate about the post when the first and second actuator levers are actuated.

9. The ladder of claim 8 wherein the first and second lock bars are coupled to a portion of a respective one of the first linkage and the second linkage, which are rotated about the post.

10. A hinge attached to a first front rail and a first rear rail, the hinge comprising:

a housing fixedly attached to the first front rail;

a rear rail hinge portion fixedly attached to the first rear rail and pivotally attached to the housing to rotate relative to a bracket, the rear rail hinge portion having a perimeter and having a plurality of slots which extend from the perimeter, the slot of the plurality of slots corresponding with a desired position of the first rear rail relative to the first rear rail; and a lock assembly disposed in the rear rail hinge portion, the lock assembly including a lock bar, a lock guide coupled to the lock bar, a spring coupled to the lock guide, one or more actuation levers coupled to the housing, one or more springs attached to the one or more actuation levers, and a linkage coupled to the one or more springs, wherein, when the lock bar is selectively disposed in one of the plurality of slots, the lock bar locks the first rear rail into a locked state in a desired position relative to the first front rail to prevent the first rear rail from moving relative to the first front rail, and the lock bar is biased to the locked state via the spring, and when the lock bar is disposed outside of one of the plurality of slots, the spring is compressed vertically permitting the lock bar to unlock the first rear rail into an unlocked state and the first rear rail can move relative to the first front rail.

11. The hinge of claim 10 wherein a first actuation lever of the one or more actuation levers is attached to a first spring of the one or more springs, and a second actuation lever of the one or more actuations levers is attached to a second spring of the one or more springs, wherein the one or more springs bias the one or more actuation levers into the locked state.

12. The hinge of claim 10 wherein the rear rail hinge portion comprises a first hinge plate and a second hinge plate generally parallel to the first hinge plate.

13. The hinge of claim 12 wherein one of the plurality of slots includes a first indentation in the first hinge plate and a second indentation in the second hinge plate, wherein the first indentation and the second indentation are aligned with one another.

14. A multi-position ladder comprising:

a front section including front rails and front rungs extending between the front rails;

a rear section including rear rails and rear rungs extending between the rear rails;

a ladder top coupled to the front section and the rear section;

a first hinge and a second hinge that couple the rear section to the front section to enable movement of the rear section relative to the front section;

a first assembly of the first hinge, the first assembly having a first lock bar, wherein the first lock bar locks the first hinge into a respective locked state when the first lock bar is engaged with any one of a first plurality of slots of the first hinge, and wherein the first lock bar unlocks the first hinge into the respective unlocked state when the first lock bar is moved out of any one of the first plurality of slots;

a second assembly of the second hinge, the second assembly having a second lock bar, wherein the second lock bar locks the second hinge into a respective locked state when the second lock bar is engaged with any one of a second plurality of slots of the second hinge and wherein the second lock bar unlocks the second hinge into the respective unlocked state when the second lock bar is moved out of any one of the second plurality of slots;

an actuator including a first lever and a second lever disposed above a top front section rung and below the ladder top, wherein the first lever is coupled to the first assembly via a first spring and a first linkage, and the second lever is coupled to the second assembly via a second spring and a second linkage, wherein the actuator is actuatable to simultaneously move both the first lock bar and the second lock bar in an upward and downward relationship relatively to the ladder top to selectively engage one of the first and second plurality of slots to transition the first hinge and the second hinge from the respective lock state thereof to the respective unlocked state thereof.

15. The multi-position ladder of claim 14 further comprising a first lock spring associated with the first hinge and a second lock spring associated with the second hinge, wherein the first lock spring and the second lock spring bias the first and second lock bars, respectively, into engagement with one of the plurality of slots.

16. The multi-position ladder of claim 14 wherein the first linkage and the second linkage each comprise an inner portion attached to the respective first spring and second spring, and an outer portion attached to the inner portion, the outer portion including a tip attached to the lock bar.

17. The multi-position ladder of claim 16 wherein the first linkage and the second linkage include a post, and wherein the outer portion is coupled to the post and rotates about the post when the first and second actuator lever are actuated.

18. The multi-position ladder of claim 17 wherein the rotation of the outer portion moves the tip upward and downward relative to the ladder top.

19. The multi-position ladder of claim 14 wherein the first hinge includes a first pair hinge plates and the second hinge includes a second pair of hinge plates, the first pair of hinge plates and the second pair hinge plates having a plurality of slots around a perimeter thereof, the plurality of slots corresponding to one or more desired positions of the rear section relative to the front section.

20. The multi-position ladder of claim 19 wherein the first lock bar moves into and out of one of the plurality of slots in the first pair of hinge plates and the second lock bar moves into and out of one of the plurality of slots in the second pair of hinge plates.

* * * * *